(12) United States Patent
Luo et al.

(10) Patent No.: US 12,058,729 B2
(45) Date of Patent: Aug. 6, 2024

(54) CHANNEL QUALITY MEASUREMENT METHOD AND APPARATUS

(71) Applicant: HUAWEI TECHNOLOGIES CO., LTD., Guangdong (CN)

(72) Inventors: Zhihu Luo, Beijing (CN); Jun Li, Shanghai (CN); Zhe Jin, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 707 days.

(21) Appl. No.: 17/212,608

(22) Filed: Mar. 25, 2021

(65) Prior Publication Data

US 2021/0212113 A1    Jul. 8, 2021

Related U.S. Application Data

(63) Continuation of application No. PCT/CN2018/108138, filed on Sep. 27, 2018.

(51) Int. Cl.
*H04W 74/00* (2009.01)
*H04W 24/10* (2009.01)
*H04W 74/0833* (2024.01)

(52) U.S. Cl.
CPC ......... *H04W 74/008* (2013.01); *H04W 24/10* (2013.01); *H04W 74/006* (2013.01); *H04W 74/0833* (2013.01)

(58) Field of Classification Search
CPC . H04W 74/008; H04W 24/10; H04W 74/006; H04W 74/0833; H04W 68/005;

(Continued)

(56) References Cited

U.S. PATENT DOCUMENTS

2011/0317652 A1* 12/2011 Kim ................. H04W 24/10
                                                         370/329
2017/0231011 A1   8/2017 Park et al.

FOREIGN PATENT DOCUMENTS

CN    107431983 A    12/2017
CN    108352953 A     7/2018
(Continued)

OTHER PUBLICATIONS

Ericsson, Support of quality report in Msg3 for non-anchor access in NB-IoT. 3GPP TSG-RAN WG1 Meeting #94, Gothenburg, Sweden, Aug. 20 24, 2018, R1-1808047, 3 pages.

(Continued)

*Primary Examiner* — Marisol Figueroa
(74) *Attorney, Agent, or Firm* — WOMBLE BOND DICKINSON (US) LLP

(57) ABSTRACT

A channel quality measurement method and apparatus are described. The method can include a network device sending configuration information to a terminal device. The configuration information configures a downlink carrier set. The terminal device determines a first downlink carrier from the downlink carrier set. The terminal device sends a random access process message 3 (Msg3) to the network device. The random access process message 3 includes first information. The first information includes information indicating channel quality of the first downlink carrier. The channel quality provides information about a first repetition level to the network device. The first repetition level is a minimum repetition level required when transmission performed on a downlink channel based on a preset transmission parameter meets a preset block error rate.

20 Claims, 9 Drawing Sheets

(58) Field of Classification Search
CPC ....... H04L 1/0009; H04L 1/0026; H04L 1/08; H04L 1/189
See application file for complete search history.

(56) References Cited

FOREIGN PATENT DOCUMENTS

| WO | 2018031300 A1 | 2/2018 | |
| WO | WO-2019151819 A1 * | 8/2019 | ............. G16Y 10/75 |

OTHER PUBLICATIONS

Huawei, HiSilicon, On support of Msg3 quality reporting for non-anchor access. 3GPP TSG RAN WG1 Meeting #94, Gothenburg, Sweden, Aug. 20-24, 2018, R1-1808110, 3 pages.

LG Electronics, Downlink channel quality report during random access procedure. 3GPP TSG RAN WG1 Meeting #94, Gothenburg, Sweden, Aug. 20 24, 2018, R1-1808469, 5 pages.

Qualcomm Incorporated, Support of quality report in msg3 for non-anchor. 3GPP TSG RAN WG1 Meeting #94, Gothenburg, Sweden, Aug. 20 24, 2018, R1-1809035, 4 pages.

Huawei, HiSilicon, Feature lead summary on support of quality report in Msg3 for non-anchor access. 3GPP TSG RAN WG1 Meeting #94, Gothenburg, Sweden, Aug. 20 24, 2018, R1-1809600, 6 pages.

Samsung Feature summary of 6.2.1.5 Support of quality report inMsg3 3GPP TSG RAN WGI Meeting #94, R1-1809527,Aug. 24, 2018 ,total 9 pages.

* cited by examiner

CHANNEL QUALITY MEASUREMENT METHOD AND APPARATUS

CROSS-REFERENCE TO RELATED APPLICATIONS

This application is a continuation of International Application No. PCT/CN2018/108138, filed on Sep. 27, 2018, the disclosure of which is hereby incorporated by reference in its entirety.

TECHNICAL FIELD

This application relates to the communications field, and more specifically, to a channel quality measurement method and apparatus.

BACKGROUND

Machine type communication (MTC), also referred to as machine-to-machine (M2M) communication or the Internet of things (IOT) communication, will be an important application in the future communications field. Future Internet of things communication may mainly cover smart metering, medical examination and monitoring, logistics inspection, industrial inspection and monitoring, the Internet of vehicles, smart communities, communication of wearable devices, and the like. The Internet of things industry constructed centering on the MTC communication is considered as a fourth wave after the computer, the Internet, and the mobile communications network, and is a development direction of a future network. It is estimated that a connection quantity of MTC devices will reach 50 billion by 2022.

Currently, in an IoT system, a network device is supported to configure a downlink carrier for a terminal device by using radio resource control (RRC) signaling. The terminal device may receive a narrowband physical downlink control channel (NPDCCH) and a narrowband physical downlink shared channel (NPDSCH) on this carrier. A current configuration manner easily causes load imbalance among various downlink carriers.

SUMMARY

In view of this, this application provides a channel quality measurement method, so that a network device can perform resource scheduling more properly.

According to a first aspect, a channel quality measurement method is provided. The method includes: A terminal device receives configuration information sent by a network device. The configuration information is used to configure a downlink carrier set. The terminal device determines a first downlink carrier from the downlink carrier set. The terminal device sends a random access process message 3 (Msg3) to the network device. Herein, Msg3 includes first information. The first information includes information used to indicate channel quality of the first downlink carrier. The channel quality is used to provide information about a first repetition level to the network device. The first repetition level is a minimum repetition level required when transmission performed on a downlink channel based on a preset transmission parameter meets a preset block error rate.

In some possible embodiments, the configuration information is carried in a system message. The system message may be a SIB22-NB or another system message.

In some possible embodiments, the downlink carrier set may include a downlink carrier that is used for a random access channel RACH and that is configured in a SIB22-NB or a downlink carrier that is used for paging and that is configured in a SIB22-NB.

In some possible embodiments, the downlink carrier set may include a downlink carrier that is used for a random access channel RACH and that is configured in a SIB22-NB or a downlink carrier subset that is used for paging and that is configured in a SIB22-NB.

In some possible embodiments, the downlink carrier set may include a downlink carrier that is associated with a RACH and that is configured in a SIB22-NB.

In some possible embodiments, the downlink carrier set may include a downlink carrier on which measurement is to be performed and that is configured by the network device.

In some possible embodiments, the downlink carrier set may include an anchor (anchor) carrier.

In some possible embodiments, the first downlink carrier includes one or more downlink carriers in the downlink carrier set.

In some possible embodiments, the downlink channel is a downlink control channel or a downlink data channel.

In some possible embodiments, the downlink channel is a downlink channel that is used to carry and schedule Msg2, carry Msg2, schedule retransmission of Msg3, or carry Msg4.

In some possible embodiments, the downlink channel is a downlink channel of data or signaling carrying Msg4.

In this embodiment of this application, the terminal device adds information about channel quality of the one or more downlink carriers in the downlink carrier set into Msg3 in a random access process. The network device may optimize resource allocation on the downlink carrier based on the channel quality of the downlink carrier, thereby improving downlink resource efficiency.

With reference to the first aspect, in some possible embodiments of the first aspect, before the terminal device sends Msg3 to the network device, the method further includes: The terminal device sends a random access process message 1 (Msg1) to the network device. The terminal device receives a random access process message 2 (Msg2) sent by the network device. Herein, Msg3 further includes second information. The second information includes information used to indicate channel quality of a second downlink carrier. The second downlink carrier is used to carry Msg2. The first downlink carrier and the second downlink carrier are different downlink carriers.

In this embodiment of this application, the terminal device adds, into Msg3 in the random access process, the information about the channel quality of the downlink carrier for carrying Msg2. This helps the network device optimize resource allocation of the downlink channel for scheduling retransmission of Msg3 and the downlink channel for carrying Msg4, thereby improving downlink resource efficiency.

With reference to the first aspect, in some possible embodiments of the first aspect, that the terminal device determines the first downlink carrier from the downlink carrier set includes: The terminal device determines one or more carriers from the downlink carrier set. The terminal device measures channel quality of each of the one or more downlink carriers. The terminal device determines the first downlink carrier based on the channel quality of each downlink carrier. The first downlink carrier is one or more downlink carriers with best channel quality in the one or more downlink carriers.

In Msg3, the terminal device reports a carrier location of the one or more downlink carriers with best channel quality after measurement in the downlink carrier set, and the downlink channel quality corresponding to the carrier. Based on this result, the network device may allocate a downlink carrier with best channel quality to the terminal device by using Msg4, to implement frequency selective scheduling. In addition, based on downlink channel quality of the carrier, resource allocation of an NPDCCH and an NPDSCH on this carrier can be optimized, thereby improving downlink resource efficiency.

With reference to the first aspect, in some possible embodiments of the first aspect, that the terminal device determines the first downlink carrier from the downlink carrier set includes: The terminal device determines the first downlink carrier from the downlink carrier set according to a preset rule.

With reference to the first aspect, in some possible embodiments of the first aspect, that the terminal device determines the first downlink carrier from the downlink carrier set according to the preset rule includes: The terminal device determines a paging carrier in the downlink carrier set as the first downlink carrier. Alternatively, the terminal device determines the first downlink carrier from the downlink carrier set based on identification information of the terminal device.

In this embodiment of this application, the terminal device reports channel quality of the downlink carrier that is determined by the terminal device according to the preset rule. The network device determines a load status of each carrier based on channel quality reported by all terminal devices. For example, based on statistical data, a carrier with relatively good downlink channel quality has relatively light load, and a carrier with relatively poor downlink channel quality has relatively heavy load. This helps the network device implement load balance. For example, some services on a carrier with relatively heavy load are allocated to a carrier with relatively light load.

With reference to the first aspect, in some possible embodiments of the first aspect, the first information further includes information used to indicate a location of the first downlink carrier.

With reference to the first aspect, in some possible embodiments of the first aspect, that the terminal device determines the first downlink carrier from the downlink carrier set includes: The terminal device receives third information sent by the network device. The third information is used to indicate the first downlink carrier. The terminal device determines the first downlink carrier from the downlink carrier set based on the third information.

In some possible embodiments, the third information is (downlink control information) DCI.

In some possible embodiments, the DCI is DCI corresponding to an NPDCCH order.

In this embodiment of this application, the terminal device reports channel quality of a downlink carrier specified by the network device. The network device determines a load status of each carrier based on channel quality reported by all terminal devices. For example, based on statistical data, a carrier with relatively good downlink channel quality has relatively light load, and a carrier with relatively poor downlink channel quality has relatively heavy load. This helps the network device implement load balance. For example, some services on a carrier with relatively heavy load are allocated to a carrier with relatively light load.

In some possible embodiments, before the terminal device sends Msg3 to the network device, the method further includes: The terminal device receives indication information sent by the network device. The indication information is used to indicate whether the terminal device is allowed to report the information about the channel quality of the second downlink carrier; and/or the indication information is used to indicate whether the terminal device is allowed to report the information about the channel quality of the first downlink carrier; and/or the indication information is used to indicate whether the terminal device is allowed to report the information about the location of the first downlink carrier.

In some possible embodiments, before the terminal device sends Msg3 to the network device, the method further includes: The terminal device sends capability information of the terminal device to the network device. The capability information is used to indicate whether the terminal device has a capability of reporting the information about the channel quality of the second downlink carrier; and/or the capability information is used to indicate whether the terminal device has a capability of reporting the information about the channel quality of the first downlink carrier; and/or the indication information is used to indicate whether the terminal device has a capability of reporting the information about the location of the first downlink carrier.

In some possible embodiments, the first information may include the information used to indicate the channel quality of the first downlink carrier, and the second information may include information used to indicate a deviation of the channel quality of the downlink carrier on which Msg2 is located, relative to the channel quality of the first downlink carrier.

In some possible embodiments, the second information may include the information used to indicate the channel quality of the downlink carrier on which Msg2 is located, and the first information may include information used to indicate a deviation of the channel quality of the first downlink carrier relative to the channel quality of the downlink carrier on which Msg2 is located.

According to a second aspect, a channel quality measurement method is provided. The method includes: A network device determines configuration information. The configuration information is used to configure a downlink carrier set. The downlink carrier set includes a first downlink carrier. The network device sends the configuration information to the terminal device. The network device receives a random access process message 3 (Msg3) sent by the terminal device. Herein, Msg3 includes first information. The first information includes information used to indicate channel quality of the first downlink carrier. The channel quality is used to provide information about a first repetition level to the network device. The first repetition level is a minimum repetition level required when transmission performed on a downlink channel based on a preset transmission parameter meets a preset block error rate.

With reference to the second aspect, in some possible embodiments of the second aspect, before the network device receives Msg3 sent by the terminal device, the method further includes: The network device receives a random access process message 1 (Msg1) sent by the terminal device. The network device sends a random access process message 2 (Msg2) to the terminal device. Herein, Msg3 further includes second information. The second information includes information used to indicate channel quality of a second downlink carrier. The second downlink carrier is used to carry Msg2. The first downlink carrier and the second downlink carrier are different downlink carriers.

With reference to the second aspect, in some possible embodiments of the second aspect, the first downlink carrier is one or more downlink carriers with best channel quality for the terminal device in one or more carriers in the downlink carrier set.

With reference to the second aspect, in some possible embodiments of the second aspect, after the network device receives Msg3 sent by the terminal device, the method further includes: The network device sends sixth information to the terminal device. The sixth information is used to indicate the first downlink carrier.

With reference to the second aspect, in some possible embodiments of the second aspect, the first downlink carrier is determined by the terminal device according to a preset rule.

With reference to the second aspect, in some possible embodiments of the second aspect, the first information further includes information used to indicate a location of the first downlink carrier.

With reference to the second aspect, in some possible embodiments of the second aspect, after the network device receives Msg3 sent by the terminal device, the method further includes: The network device sends third information to the terminal device. The third information is used to indicate the first downlink carrier.

With reference to the second aspect, in some possible embodiments of the second aspect, the method further includes: The network device determines load of the first downlink carrier based on the channel quality of the first downlink carrier. The network device adjusts the load of the first downlink carrier.

In a possible implementation, the first information may include the information used to indicate the channel quality of the first downlink carrier, and the second information may include information used to indicate a deviation of the channel quality of the downlink carrier on which Msg2 is located, relative to the channel quality of the first downlink carrier. The method further includes the following:

The network device may determine, based on the deviation in the second information and the channel quality in the first information, the channel quality of the downlink carrier on which Msg2 is located.

In another possible implementation, the second information may include the information used to indicate the channel quality of the downlink carrier on which Msg2 is located, and the first information may include information used to indicate a deviation of the channel quality of the first downlink carrier relative to the channel quality of the downlink carrier on which Msg2 is located. The method further includes the following:

The network device may determine, based on the deviation in the first information and the channel quality in the second information, the channel quality of the first downlink carrier.

According to a third aspect, a channel quality measurement method is provided. The method includes: A terminal device receives configuration information sent by a network device. The configuration information is used to configure a downlink carrier set. The terminal device performs measurement on a plurality of downlink carriers in the downlink carrier set, to obtain channel quality of each downlink carrier. The terminal device determines an average value of the channel quality of the plurality of downlink carriers. The terminal device sends a random access process message 3 Msg3 to the network device. Herein, Msg3 includes the average value of the channel quality of the plurality of downlink carriers.

According to a fourth aspect, a channel quality measurement method is provided. The method includes: A network device sends configuration information to a terminal device. The configuration information is used to configure a downlink carrier set. The network device receives a random access process message 3 Msg3 sent by the terminal device. Herein, Msg3 includes an average value of channel quality of a plurality of downlink carriers. The downlink carrier set includes the plurality of downlink carriers.

According to a fifth aspect, a channel quality measurement apparatus is provided, and is configured to perform the method in the first aspect or any possible implementation of the first aspect, or in the third aspect or any possible implementation of the third aspect. Specifically, the channel quality measurement apparatus may include units configured to perform the method in the first aspect or any possible implementation of the first aspect, or in the third aspect or any possible implementation of the third aspect.

According to a sixth aspect, a channel quality measurement apparatus is provided, and is configured to perform the method in the second aspect or any possible implementation of the second aspect, or in the fourth aspect or any possible implementation of the fourth aspect. Specifically, the channel quality measurement apparatus may include units configured to perform the method in the second aspect or any possible implementation of the second aspect, or in the fourth aspect or any possible implementation of the fourth aspect.

According to a seventh aspect, a channel quality measurement apparatus is provided. The apparatus may be the terminal device in the foregoing method designs, or may be a chip disposed in the terminal device. The apparatus includes a processor. The processor is coupled to a memory. The processor may be configured to execute an instruction in the memory, to implement the method performed by the terminal device in the first aspect or any possible implementation of the first aspect, or in the third aspect or any possible implementation of the third aspect. Optionally, the apparatus further includes the memory. Optionally, the apparatus further includes a communications interface. The processor is coupled to the communications interface.

When the apparatus is the terminal device, the communications interface may be a transceiver or an input/output interface.

When the apparatus is the chip disposed in the terminal device, the communications interface may be an input/output interface.

Optionally, the transceiver may be a transceiver circuit. Optionally, the input/output interface may be an input/output circuit.

According to an eighth aspect, a channel quality measurement apparatus is provided. The apparatus may be the network device in the foregoing method designs, or may be a chip disposed in the network device. The apparatus includes a processor. The processor is coupled to a memory. The processor may be configured to execute an instruction in the memory, to implement the method performed by the network device in the second aspect or any possible implementation of the second aspect, or in the fourth aspect or any possible implementation of the fourth aspect. Optionally, the apparatus further includes the memory. Optionally, the apparatus further includes a communications interface. The processor is coupled to the communications interface.

When the apparatus is the network device, the communications interface may be a transceiver or an input/output interface.

When the apparatus is the chip disposed in the network device, the communications interface may be an input/output interface.

Optionally, the transceiver may be a transceiver circuit. Optionally, the input/output interface may be an input/output circuit.

According to a ninth aspect, a program is provided. When the program is executed by a processor, the program is used to perform the methods provided in the first aspect to the fourth aspect.

According to a tenth aspect, a program product is provided. The program product includes program code. When the program code is run by a communications unit and a processing unit or by a transceiver and a processor of an apparatus (such as a network device or a terminal device), the apparatus is enabled to perform the method in any one of the first aspect to the fourth aspect and any possible implementation thereof.

According to an eleventh aspect, a computer readable medium is provided. The computer readable medium stores a program. The program enables an apparatus (such as a network device or a terminal device) to perform the method in any one of the first aspect to the fourth aspect and any possible implementation thereof.

DESCRIPTION OF EMBODIMENTS

Figure 1:
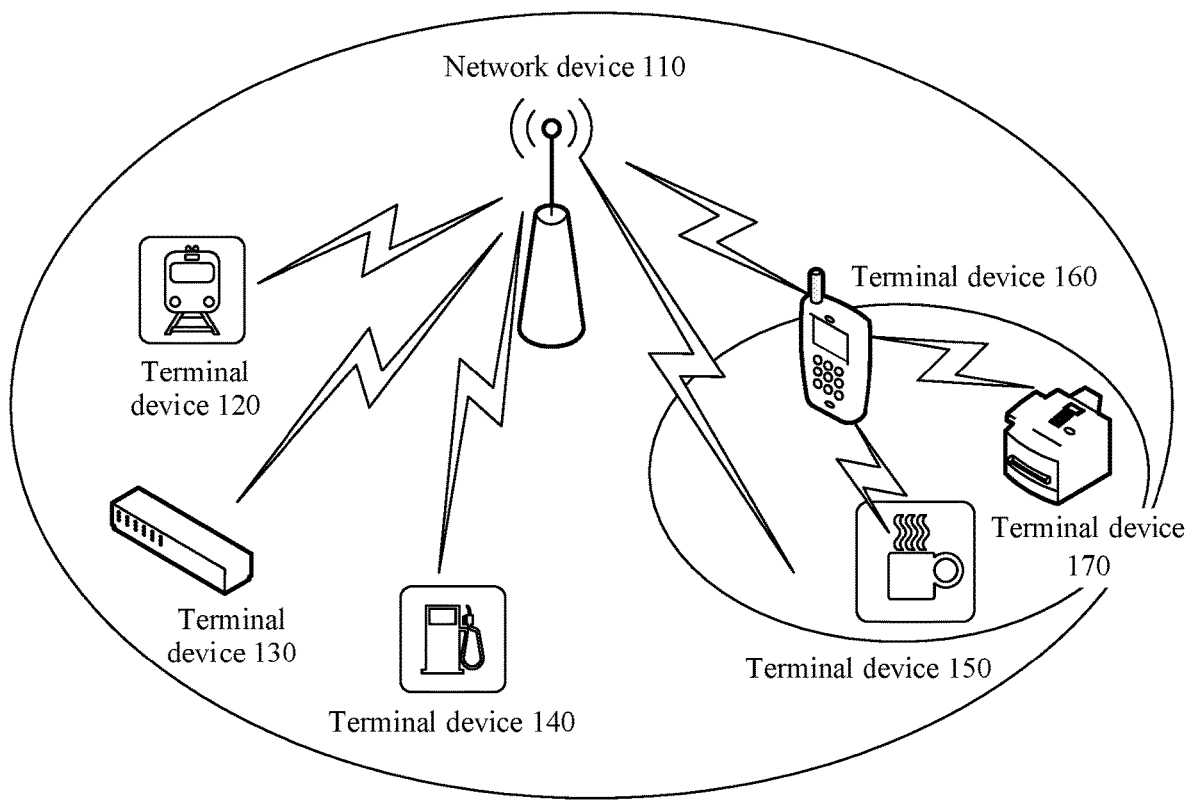
FIG. 1 is a schematic diagram of an application scenario of a technical solution according to an embodiment of this application.

The following describes technical solutions of this application with reference to accompanying drawings.

The technical solutions of embodiments of this application may be used in various communications systems, such as: a global system for mobile communications (GSM), a code division multiple access (CDMA) system, a wideband code division multiple access (WCDMA) system, a general packet radio service (general packet radio service, GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

The terminal device in the embodiments of this application may be referred to as user equipment, an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device may also be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

A network device in the embodiments of this application may be a device configured to communicate with a terminal device. The network device may be a base transceiver station (BTS) in a global system for mobile communications (GSM) or code division multiple access (CDMA), or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems for implementing service processing by using a process, for example, a Linux™ operating system, a Unix™ operating system, an Android™ operating system, an iOS™ operating system, or a Windows™ operating system. The application layer includes applications such as a browser, an address book, word processing software, and instant messaging software. In addition, the embodiments of this application do not particularly limit a specific structure of an execution body of the method provided in the embodiments of this application, provided that a program recording code of the method provided in the embodiments of this application can be run to implement communication according to the method provided in the embodiments of this application. For example, the execution body of the method provided in the embodiments of this application may be the terminal device or the network device, or may be a function module that can invoke and execute a program in the terminal device or the network device.

In addition, aspects or features of this application may be implemented as a method, an apparatus, or a product that uses standard programming and/or engineering technologies. The term "product" used in this application covers a computer program that can be accessed from any computer readable component, carrier, or medium. For example, a computer-readable medium may include but is not limited to: a magnetic storage component (for example, a hard disk, a floppy disk, or a magnetic tape), an optical disc (for example, a compact disc (CD), a digital versatile disc (DVD), a smart card, or a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

FIG. 1 is a schematic diagram of an application scenario of a technical solution according to an embodiment of this application. As shown in FIG. 1, a network device 110 and a terminal device 120 to a terminal device 170 form a communications system. In the communications system, the network device 110 may send downlink information to the terminal device 120 to the terminal device 170, and the terminal device 120 to the terminal device 170 may also send uplink information to the network device 110. In addition, the terminal device 150 to the terminal device 170 may also form a communications system. In the communications system, the terminal device 160 may send information to the terminal device 150 and the terminal device 170, and the terminal device 150 and the terminal device 170 may also send information to the terminal device 160.

It should be understood that the channel quality measurement method provided in this application may be applied to a wireless communications system. For example, in the wireless communications system shown in FIG. 1, there is a wireless communication connection between two communications apparatuses in the wireless communications system. One communications apparatus in the two communications apparatuses may correspond to the terminal device shown in FIG. 1, for example, may be the terminal device 160 in FIG. 1 or may be a chip configured in the terminal device 160. The other communications apparatus in the two communications apparatuses may correspond to the network device shown in FIG. 1, for example, may be the network device 110 in FIG. 1 or may be a chip configured in the network device 110.

Figure 2:
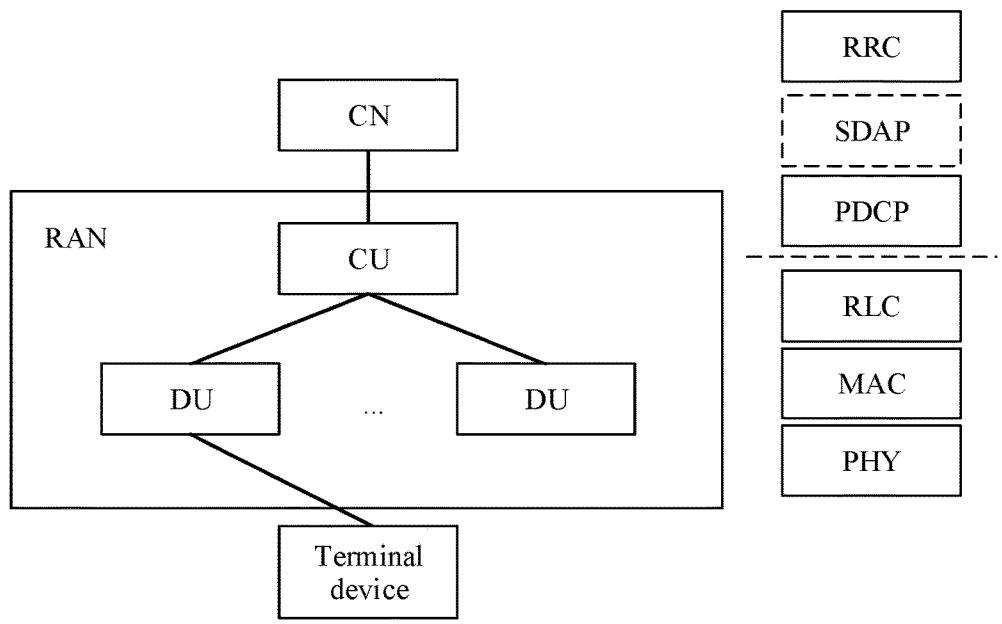
FIG. 2 is a schematic diagram of a network architecture according to an embodiment of this application.

FIG. 2 is a schematic diagram of a network architecture according to an embodiment of this application. As shown in FIG. 2, the network architecture includes a core network (CN) device and a radio access network (RAN) device. The RAN device includes a baseband apparatus and a radio frequency apparatus. The baseband apparatus may be implemented by one node, or may be implemented by a plurality of nodes. The radio frequency apparatus may be remote from the baseband apparatus and be independently implemented, or may be integrated into the baseband device, or may be partially remote from the baseband apparatus and partially integrated into the baseband apparatus. For example, in an LTE communications system, the RAN device (e.g., an eNB) includes the baseband apparatus and the radio frequency apparatus. The radio frequency apparatus may be disposed remotely from the baseband apparatus. For example, a remote radio unit (RRU) is disposed remotely from a BBU.

Communication between the RAN device and the terminal device follows a specific protocol layer structure. For example, a control plane protocol layer structure may have functions of protocol layers including a radio resource control (RRC) layer, a packet data convergence protocol (PDCP) layer, a radio link control (RLC) layer, a media access control (MAC) layer, a physical layer, and the like. A user plane protocol layer structure may have functions of protocol layers including the PDCP layer, the RLC layer, the MAC layer, the physical layer, and the like. In an implementation, a service data adaptation protocol (SDAP) layer may be further included above the PDCP layer.

The functions of these protocol layers may be implemented by one node, or may be implemented by a plurality of nodes.

The RAN device may implement the functions of the protocol layers such as RRC, PDCP, RLC, and MAC by using one node; or may implement the functions of these protocol layers by using a plurality of nodes. For example, in an evolved structure, the RAN device may include a CU and a DU. A plurality of DUs may be centrally controlled by one CU. As shown in FIG. 2, the CU and the DU may be divided according to a protocol layer of a wireless network. For example, functions of the PDCP layer and a protocol layer above are set in the CU; and functions of protocol layers below the PDCP layer, for example, functions of the RLC layer and the MAC layer are set in the DU.

The protocol layer division is merely an example, or may be further performed at another protocol layer. For example, division is performed at the RLC layer. Functions of the RLC layer and a protocol layer above are set in the CU, and functions of a protocol layer below the RLC layer are set in the DU. Alternatively, division is performed at a specific protocol layer. For example, some functions of the RLC layer and functions of a protocol layer above the RLC layer are set in the CU, and remaining functions of the RLC layer and functions of a protocol layer below the RLC layer are set in the DU. In addition, the division may be alternatively performed in another manner. For example, the division is performed based on a delay. A function whose processing time needs to meet a delay requirement is set in the DU, and a function whose processing time does not need to meet the delay requirement is set in the CU.

In addition, the radio frequency apparatus may be remote and not disposed in the DU, or may be integrated into the DU, or may be partially remote and partially integrated into the DU. This is not limited herein.

Figure 3:
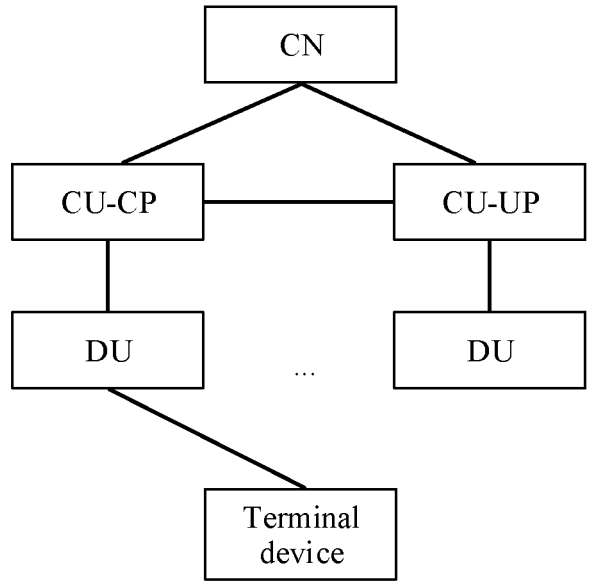
FIG. 3 is a schematic diagram of another network architecture according to an embodiment of this application.

FIG. 3 is a schematic diagram of another network architecture according to an embodiment of this application. In comparison with the architecture shown in FIG. 2, a control plane (CP) and a user plane (UP) of a CU may be separated and implemented by different entities, which are respectively a control plane CU entity (CU-CP entity) and a user plane CU entity (CU-UP entity).

In the foregoing network architecture, signaling generated by the CU may be sent to a terminal device by using the DU, or signaling generated by a terminal device may be sent to the CU by using the DU. The DU may not parse the signaling. Instead, the DU may directly perform protocol layer encapsulation on the signaling and transmit the encapsulated signaling to the terminal device or the CU. In the following embodiment, if the signaling is transmitted between the DU and the terminal, in this case, sending or receiving the signaling by the DU includes this scenario. For example, signaling at an RRC layer or a PDCP layer is processed to finally obtain signaling at a PHY layer and then sent to the terminal device, or is converted from received signaling at a PHY layer. In this architecture, signaling at the RRC layer or the PDCP layer may be considered as being sent by the DU, or being sent by the DU and a remote radio unit.

In the foregoing embodiment, the CU may be classified into a network device on a RAN side, or the CU may be classified into a network device on a CN side. This is not limited herein.

The apparatus in the following embodiments of this application may be located in a terminal based on a function implemented by the apparatus. When the foregoing CU-DU structure is used, the network device may be a CU node, a DU node, or a RAN device including a CU node and a DU node.

Before the technical solutions provided in the embodiments of this application are described, related technical terms in the embodiments of this application are first described:

A coverage level: A network device provides narrowband reference signal received power (NRSRP) thresholds for different coverage levels by using system information. The NRSRP threshold is mainly determined by the network device based on an uplink interference status (if uplink interference is relatively large, the NRSRP threshold is set to relatively large; and therefore, more terminal devices are at a poor coverage level, select a narrowband physical random access channel (NPRACH) resource at the poor coverage level, and send an NPRACH by using a greater quantity of repetition times). As long as an NRSRP is higher than the threshold, a preamble sequence (preamble) of a random access process message 1 (Msg1) sent by the terminal device is detected by the network device in a preset probability.

A narrowband Internet of things (NB-IOT) system needs to support a large coverage area. The network device has different scheduling policies for terminal devices in different communications environments. For example, a terminal device at a central location of a cell has a good wireless channel condition, and the network device can establish a reliable communication link by using a relatively small power. Data transmission may be quickly completed by using a technology such as a large transmission code block, high-order modulation, or carrier binding. However, a terminal device located at a cell edge or a basement has relatively poor radio channel quality, and the network device may need to use a relatively large power to maintain a link. In a data transmission process, data transmission may be completed by using technologies such as a small code block, low-order modulation, repeated sending, and a spread spectrum.

To ensure communication reliability and reduce a transmit power of the network device, terminal devices of different channel conditions need to be differentiated, to facilitate scheduling performed by the network device. Therefore, a concept of a coverage level is introduced into the NB-IOT system. Terminal devices at the same coverage level have similar channel transmission conditions. The network device may use similar scheduling parameters for this type of users. Control signaling overheads occupied by these terminal devices are also similar.

For example, the NB-IOT system may be divided into three coverage levels. A coverage level of a terminal device relatively close to the network device is "common coverage", and a quantity of repetition times is non-repetition. A coverage level of a terminal device relatively distant from the network device is "edge coverage", and a quantity of repetition times is medium. A coverage level of a terminal device in a scenario such as a basement is "expanded coverage", and a quantity of repetition times may be up to hundreds of times or even thousands of times. The terminal device selects a proper quantity of transmission times based on the coverage level, thereby reducing unnecessary repetition and reducing power overheads.

Figure 4:
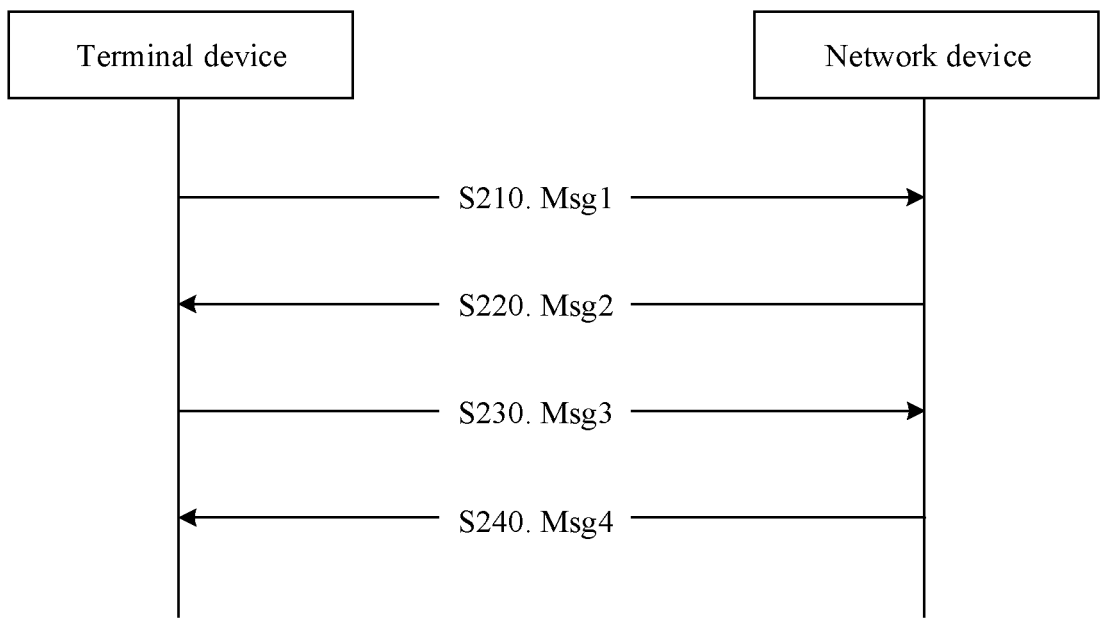
FIG. 4 is a schematic flowchart in which a terminal device and a network device complete random access by using four steps according to an embodiment of this application.

FIG. 4 is a schematic flowchart in which a terminal device and a network device complete random access by using four steps according to an embodiment of this application. It should be understood that, in an example of contention based random access (CBRA) in NR in FIG. 4, the process includes the following steps:

S210. The terminal device sends a random access process message 1 (Msg1) to the network device.

It should be understood that the random access process message 1 (Msg1) may also be referred to as a random access request message or a random access preamble sequence (preamble).

A main function of the preamble is to notify the network device that there is a random access request, so that the network device can estimate a transmission delay between the network device and the terminal device. In this way, the network device calibrates uplink timing, and notifies the terminal device of calibration information by using a random access process message 2 (Msg2) in step S220.

The terminal device may select the preamble and transmit the preamble on a physical random access channel (PRACH). The network device notifies, by using a system message, the terminal device of a time-frequency resource set of the PRACH that can be used to transmit the preamble in a current cell. When initiating random access, the terminal device further needs to select the PRACH resource to send the preamble.

Optionally, before the terminal device sends Msg1, the method 200 further includes:

The network device sends a system message to the terminal device. The system message includes configuration information of an uplink carrier and a downlink carrier.

For example, a non-anchor narrowband Internet of things carrier (non-anchor NB-IOT carrier) introduced into typical Rel-14 is used for a RACH. The network device may broadcast narrowband physical random access channel (NPRACH) resource information on an anchor carrier by using a narrowband system information block 2 (SIB2-NB). A downlink (DL) narrowband Internet of things carrier (NB-IOT carrier) corresponding to an uplink (UL) anchor carrier is a downlink anchor carrier (DL anchor carrier).

In an NB-IOT system, for frequency division duplex (FDD), the anchor carrier indicates a carrier on which the terminal device assumes that a narrowband primary synchronization signal (NPSS)/a narrowband secondary synchronization signal (NSSS)/a narrowband physical broadcast channel (NPBCH)/a narrowband system information block (SIB-NB) are transmitted. For time division duplex (TDD), the anchor carrier indicates a carrier on which the terminal device assumes that an NPSS/NSSS/NPBCH are transmitted.

In the NB-IOT system, for FDD, the non-anchor carrier indicates a carrier on which the terminal device assumes that no NPSS/NSSS/NPBCH/SIB-NB is transmitted. For TDD, the non-anchor carrier indicates a carrier on which the terminal device assumes that no NPSS/NSSS/NPBCH is transmitted.

The network device may broadcast configuration information of a series of non-anchor carriers in a narrowband system information block 22 (NB-SIB22). The configuration information includes configuration information of a series of DL non-anchor carriers and UL non-anchor carriers. For example, an NPRACH resource is configured on each UL non-anchor carrier based on a coverage level. A parameter: npdcch-carrierIndex-r14 may be configured for each NPRACH resource. This parameter is used to indicate identification information of a downlink carrier that is used for Msg2 corresponding to Msg1 of the NPRACH resource, an NPDCCH for scheduling retransmission of Msg3, an NPDCCH for scheduling Msg4, and transmission of Msg4. Herein, Msg2 and Msg4 may be carried by using an NPDSCH.

The terminal device determines a downlink carrier set. A downlink carrier list is configured in a system message (for example, the SIB22-NB). Each entry in the list includes configuration information of a carrier. The configuration information includes a location of a center frequency of the carrier, a deployment mode, power configuration of a reference signal, effective subframe configuration, downlink spacing configuration, and the like. Downlink carriers may be numbered. For example, an index of a first entry in the list is '1', an index of a second entry is '2', and so on. Subsequently, a downlink carrier may be addressed based on an index.

The downlink carrier set may be a downlink carrier that is configured by using a system message and that is used for random access or paging.

For example, 15 downlink carriers used for random access or paging are configured by using a system message. The 15 downlink carriers may be used as the downlink carrier set.

For another example, the downlink carrier set is downlink carriers that are configured by using a system message and that are associated with the RACH, that is, downlink carriers that are specified in RACH resource configuration and that are used for Msg2, the NPDCCH for scheduling retransmission of Msg3, the NPDCCH for scheduling Msg4, and transmission of Msg4. Herein, Msg2 and Msg4 may be carried by using the NPDSCH. For example, 15 downlink carriers used for random access or paging are configured by using a system message, and only five downlink carriers are associated with the RACH. The five downlink carriers may be used as the downlink carrier set.

Optionally, the method 200 further includes:

The terminal device determines a first uplink carrier.

The terminal device sends Msg1 to the network device on the first uplink carrier.

Specifically, the terminal device may select, based on configuration in the SIB2-NB and the SIB22-NB, an uplink carrier in a preset probability to send Msg1.

Optionally, the terminal device determines a first random access channel resource on the first uplink carrier based on the coverage level.

The terminal device sends Msg1 to the network device on the first random access channel resource.

Specifically, the terminal device further needs to select a PRACH resource on the first uplink carrier to send Msg1. The terminal device may determine, based on the coverage level, a specific PRACH resource on the first uplink carrier to send Msg1; and determine, based on the configuration information in the SIB2 or the SIB22, a downlink carrier corresponding to the selected uplink PRACH resource. In this way, the terminal device learns that the NPDCCH for scheduling Msg2 in a RACH process, Msg2, the NPDCCH for scheduling retransmission of Msg3, the NPDCCH for scheduling Msg4, and Msg 4 are all sent on the downlink carrier. Herein, Msg2 and Msg4 may be carried by using the NPDSCH.

The following describes a process in which the terminal device determines the coverage level of the terminal device.

(1) The terminal device measures, based on a narrowband reference signal (NRS) sent on a downlink NB-IOT carrier, an NRSRP on a carrier that is measured by the terminal device (the NRSRP directly reflects a transmission loss of a radio signal between the network device and the terminal device).

(2) The terminal device compares the NRSRP obtained through measurement with several NRSRP thresholds (the NRSRP thresholds are delivered by using a system message), and determines the coverage level of the terminal device based on a comparison result.

In the NB-IOT, two NRSRP thresholds can be delivered at most by using a system message. An example in which two NRSRP thresholds (an NRSRP threshold 1 and an NRSRP threshold 2) are delivered is used in the following. If the NRSRP value measured by the terminal device is less than the NRSRP threshold 2, the terminal device is at a coverage level 2 (corresponding to expanded coverage). Otherwise, if the NRSRP value measured by the terminal device is less than the NRSRP threshold 1, the terminal device is at a coverage level 1 (corresponding to edge coverage). Otherwise, the terminal device is at a coverage level 0 (corresponding to common coverage). The network device configures different NPRACH resources based on different coverage levels. The NPRACH resource includes a quantity of repetition times (which may be 1, 2, 4, 8, 16, 32, 64, or 128), a quantity of subcarriers, configuration information of common search space of an NPDCCH for carrying a random access response (common search space for random access response), and the like.

The terminal device obtains the corresponding coverage level by comparing the NRSRP obtained through measurement and the NRSRP threshold, and sends Msg1 on the NPRACH resource corresponding to the coverage level. For different coverage levels, the terminal device sends Msg1 by using different NPRACH power control manners and different quantities of repetition times, to ensure reception performance of receiving an uplink NPRACH.

S220. The terminal device sends a random access process message 2 (Msg2) to the terminal device.

It should be understood that the random access process message 2 (Msg2) may also be referred to as a random access response message.

Specifically, after receiving the preamble sent by the terminal device, the network device sends a corresponding random access response (RAR) to the terminal device. The random access response may include time domain and frequency domain information of the random access process message 3 (Msg3) transmitted in step S230, a modulation and coding scheme used for Msg3, a preamble identifier, timing advance (TA) information, and initial uplink grant (UL grant) information; and may further carry identification information of the terminal device. For CBRA, after receiving the RAR, the terminal device determines whether the preamble identifier in the RAR is the same as an identifier of the preamble sent in step S210. If the two preamble identifiers are the same, it is considered that the RAR is successfully received. Otherwise, it is considered that the RAR fails to be received, and the terminal device may trigger an RA process again.

S230. The terminal device sends the random access process message 3 (Msg3) to the network device.

Specifically, the terminal device sends data on a corresponding uplink transmission resource by using a physical uplink shared channel (PUSCH) based on the UL grant information indicated in the RAR. The RAR may include an RRC message, and the identification information of the terminal device, for example, C-RNTI information of the terminal device, or a resume identifier (Resume ID) or an inactive identifier (I-RNTI) of the terminal device. The resume ID or the I-RNTI is allocated by the network device to the terminal device. The identifier reported by the terminal device is used by the network device to identify an identity of the terminal device, related configuration information of the terminal device, and the like.

For the NB-IOT, the identification information of the terminal device may be a SAE-temporary mobile subscriber identity (S-TMSI), or a random number.

S240. The network device sends a random access process message 4 (Msg4) to the terminal device.

Specifically, because the terminal device adds the identification information of the terminal device in step S230, the network device in a conflict resolving mechanism adds the identification information of the terminal device into Msg4 in step S240, to specify a terminal device that succeeds in conflict cancelation. Another terminal device that does not succeed in conflict cancelation re-initiates random access.

It may be learned that the coverage level in the current NB-IOT system corresponds to the specific coverage level after the measured value of the downlink NRSRP is compared with the NRSRP threshold pre-configured by the network device. When setting the NRSRP threshold, the network device should ensure the reception performance of the uplink NPRACH preamble as much as possible. A terminal device with a relatively small NRSRP may select a PRACH with a high coverage level to repeatedly send the preamble for a plurality of times.

However, in actual network deployment, there is a difference between an interference level of uplink reception of the network device and an interference level of the downlink terminal device. Even for terminal devices with the same NRSRP, signal to interference plus noise ratios (SINR) of downlink reception performed by the terminal devices may be very different from each other due to different specific locations of the terminal devices. Therefore, the coverage level determined through measurement of the NRSRP cannot reflect downlink channel quality and reception performance of the terminal device.

The network device may generally set, based on uplink PRACH reception performance, the NRSRP threshold determined based on the coverage level. The coverage level determined by the terminal device based on the NRSRP threshold can relatively accurately reflect an uplink reception status, but be difficult in reflecting the downlink SINR of the terminal device. Therefore, the network device actually cannot accurately understand a downlink coverage status of the terminal. Generally, only a maximum quantity of repetition times of the NPDCCH search space may be configured relatively conservatively, or downlink data may be scheduled relatively conservatively. In this case, power consumption of the terminal device and consumption of system resources are relatively great.

In addition, the NB-IOT system supports configuring a downlink carrier for the terminal device by using RRC signaling. Because the terminal device cannot know a downlink coverage status of each carrier and a load status (for example, light load or full load), the network device blindly allocates the downlink carrier and the downlink resource to the terminal device. This easily causes load imbalance between the downlink carriers and unreasonable allocation of downlink transmission resources.

The embodiments of this application provide a channel quality measurement method and apparatus. The terminal device reports the channel quality of the downlink carrier to the network device, which helps the network device learn of the load status of the downlink carrier and helps the network device perform resource scheduling more properly.

Figure 5:
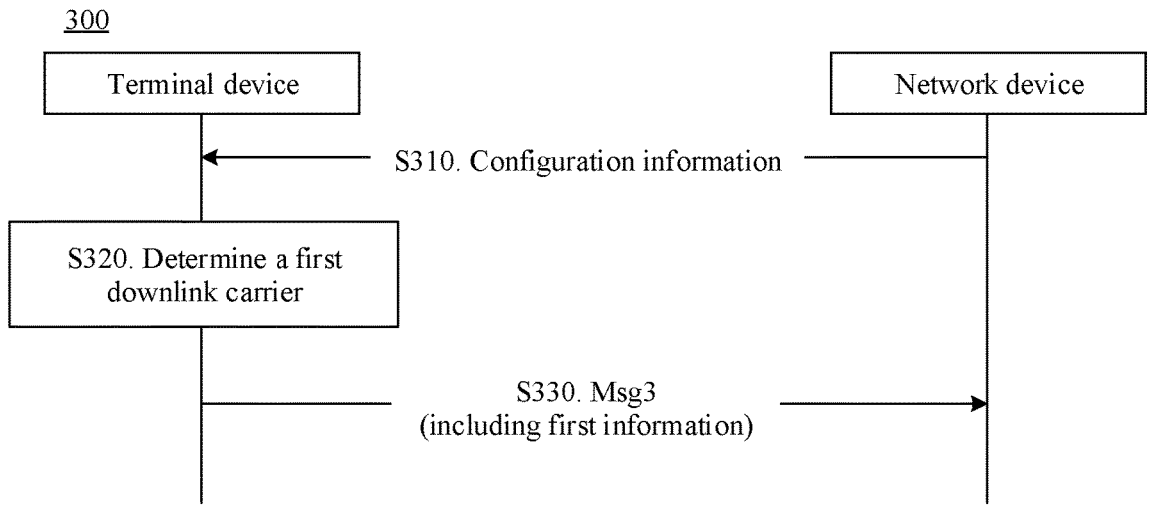
FIG. 5 is a schematic flowchart of a channel quality measurement method according to an embodiment of this application.

FIG. 5 is a schematic flowchart of a channel quality measurement method 300 according to an embodiment of this application. As shown in FIG. 5, the method 500 includes the following steps:

S310. A network device sends configuration information to a terminal device, and the terminal device receives the configuration information sent by the network device. The configuration information is used to configure a downlink carrier set.

Optionally, the downlink carrier set includes one or more downlink carriers.

Optionally, the configuration information is carried in a system message. The system message may be a SIB22-NB or another system message.

Optionally, the downlink carrier set may include a downlink carrier that is used for a random access channel (RACH) and that is configured in the SIB22-NB or a downlink carrier that is used for paging and that is configured in the SIB22-NB.

Optionally, the downlink carrier set may include the downlink carrier that is used for the RACH and that is configured in the SIB22-NB or a downlink carrier set that is used for paging and that is configured in the SIB22-NB. In other words, the downlink carrier set may include the downlink carrier that is used for the RACH and that is configured in the SIB22-NB or some of the downlink carriers that are used for paging and that are configured in the SIB22-NB.

Optionally, the downlink carrier set may include a downlink carrier that is associated with a RACH and that is configured in the SIB22-NB.

Optionally, the downlink carrier set may include a downlink carrier on which measurement is to be performed and that is configured by the network device.

Optionally, the downlink carrier set may include an anchor carrier.

S320. The terminal device determines a first downlink carrier from the downlink carrier set.

Optionally, the first downlink carrier includes one or more downlink carriers.

Optionally, the first downlink carrier includes one or more downlink carriers in the downlink carrier set.

Optionally, the first downlink carrier includes one or more downlink carriers with best channel quality for the terminal device in the one or more downlink carriers in the downlink carrier set.

Optionally, the first downlink carrier includes one or more downlink carriers indicated by the network device.

Optionally, the first downlink carrier includes one or more downlink carriers determined by the terminal device according to a preset rule.

Optionally, the first information further includes information used to indicate a location of the first downlink carrier.

S330. The terminal device sends a random access process message 3 Msg3 to the network device, and the network device receives Msg3 sent by the terminal device. Herein, Msg3 includes first information. The first information includes information used to indicate channel quality of the first downlink carrier. The channel quality is used to provide the network device with information about a minimum repetition level required when transmission performed on a downlink channel based on a preset transmission parameter meets a preset block error rate.

Optionally, the preset block error rate may be 1% or 10%.

Optionally, the downlink channel is a downlink control channel or a downlink data channel.

Optionally, the downlink channel is a downlink channel that is used to carry and schedule Msg2, carry Msg2, schedule retransmission of Msg3, or carry Msg4.

Optionally, the downlink channel is a downlink channel of data or signaling carrying Msg4.

It should be understood that, in this embodiment of this application, the terminal device may measure the channel quality of the first downlink carrier before sending Msg3.

In this embodiment of this application, the terminal device adds the information about the channel quality of the one or more downlink carriers in the downlink carrier set into Msg3 in a random access process. The network device may optimize resource allocation on the downlink carrier based on the channel quality of the downlink carrier, thereby improving downlink resource efficiency.

Optionally, before the network device receives Msg3 sent by the terminal device, the method further includes that the terminal device sends a random access process message 1 (Msg1) to the network device, and the network device receives Msg1 sent by the terminal device; and the network device sends a random access process message 2 (Msg2) to the terminal device, and the terminal device receives Msg2 sent by the network device.

Herein, Msg3 further includes second information. The second information includes information used to indicate channel quality of a second downlink carrier. The second downlink carrier is used to carry Msg2.

In this embodiment of this application, the terminal device adds, into Msg3 in the random access process, the information about the channel quality of the downlink carrier for carrying Msg2. This helps the network device optimize resource allocation of the downlink channel for scheduling retransmission of Msg3 and the downlink channel for carrying Msg4, thereby improving downlink resource efficiency.

Optionally, before the network device receives the random access process message 3 sent by the terminal device, the method further includes that the network device sends indication information to the terminal device, where the indication information is used to indicate whether the terminal device is allowed to report the information about the channel quality of the second downlink carrier, and/or the indication information is used to indicate whether the terminal device is allowed to report the information about the channel quality of the first downlink carrier, and/or the indication information is used to indicate whether the terminal device is allowed to report the information about the location of the first downlink carrier.

The indication information may be implemented by using a system message, RRC signaling, a media access control (MAC) control element (CE), or an RAR.

For example, the terminal device first determines the indication information before reporting the downlink channel quality. If the indication information indicates that the terminal device is allowed to report the information about the channel quality of the second downlink carrier, the information about the channel quality of the first downlink carrier, and the information about the location of the first downlink carrier, the terminal device may report the first information and the second information by using the random access process message 3.

Optionally, before the network device receives the random access process message 3 sent by the terminal device, the method further includes that the terminal device sends capability information of the terminal device to the network device, where the capability information is used to indicate whether the terminal device has a capability of reporting the information about the channel quality of the second downlink carrier, and/or the capability information is used to indicate whether the terminal device has a capability of reporting the information about the channel quality of the first downlink carrier, and/or the capability information is used to indicate whether the terminal device has a capability of reporting the information about the location of the first downlink carrier.

For example, if the terminal device has the capability of reporting the information about the channel quality of the second downlink carrier, the information about the channel quality of the first downlink carrier, and the information about the location of the first downlink carrier, the terminal device may report the first information and the second information in the random access process message 3.

For example, the terminal device may report the capability in an explicit manner. Information including one or more bits is used to indicate whether the terminal device has the capability. When one bit is used as an example, "1" indicates that the terminal device has the capability, and "0" indicates that the terminal device does not have the capability.

For another example, the terminal device may report the capability in an implicit manner. The network device may configure a plurality of random access resources. Each random access resource is associated with a capability of the terminal device. The terminal device selects different random access resources to initiate random access, to implicitly indicate the capability of the terminal device. For example, two random access resources: a first random access resource and a second random access resource are configured. The first random access resource is selected to indicate that the terminal device has the capability, and the second random access resource is selected to indicate that the terminal device does not have the capability.

Optionally, Msg3 further includes first indication information. The first indication information includes information used to indicate a type of information that is reported by the terminal device in Msg3. For example, the first indication information may be used to indicate that the first information or the second information is reported in Msg3. The first indication information may be further used to indicate that the first information or the second information is reported in Msg3, or the first information and the second information are reported in Msg3.

It should be understood that, in this embodiment of this application, the terminal device may carry information about channel quality of a plurality of downlink carriers in Msg3. Optionally, Msg3 includes information about channel quality of a specific carrier (that has best channel quality, that is indicated by the network device, or that is determined by the terminal device according to a preset rule) in the downlink carrier set and the information about the channel quality of the downlink carrier for carrying Msg2.

It should also be understood that if the specific carrier in the downlink carrier set and the downlink carrier for carrying Msg2 are the same downlink carrier, the terminal device only needs to add, into Msg3, the information about the channel quality of the downlink carrier for carrying Msg2.

Figure 6:
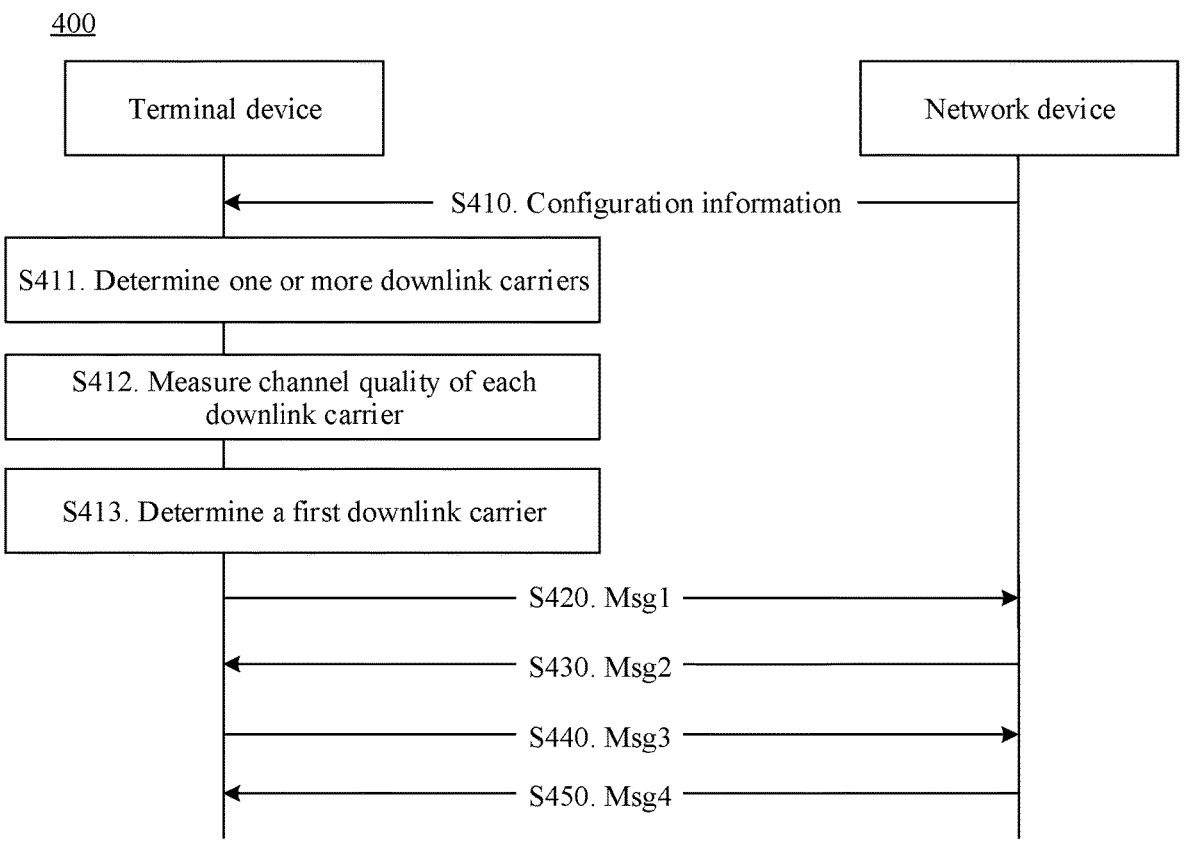
FIG. 6 is a schematic flowchart of another channel quality measurement method according to an embodiment of this application.

FIG. 6 is a schematic flowchart of a channel quality measurement method 400 according to an embodiment of this application. As shown in FIG. 6, the method 400 includes the following steps:

S410. A network device sends configuration information to a terminal device, and the terminal device receives the configuration information sent by the network device. The configuration information is used to configure a downlink carrier set.

Optionally, the configuration information is carried in a system message.

Optionally, the system message is a SIB22-NB or another system message.

Optionally, the system message includes a SIB2-NB and a SIB22-NB.

Optionally, the configuration information is carried in RRC signaling, a media access control (MAC) control element (CE), or an RAR indication.

It should be understood that functions of the SIB2-NB and the SIB22-NB have already been described in the method 200. For brevity, details are not described herein again.

S420. The terminal device sends a random access process message 1 (Msg1) to the network device, and the network device receives Msg1 sent by the terminal device.

It should be understood that the terminal device may send Msg1 on a first random access resource on a first uplink carrier. A process in which the terminal device determines the first uplink carrier and the first random access resource has already been described in the method 200. For brevity, details are not described herein again.

Optionally, the method 400 further includes:

S411. The terminal device determines one or more carriers from the downlink carrier set.

S412. The terminal device measures channel quality of each of the one or more downlink carriers.

S413. The terminal device determines a first downlink carrier based on the channel quality of each downlink carrier.

Optionally, the first downlink carrier is one or more downlink carriers with best channel quality in the one or more downlink carriers.

It should be understood that, in this embodiment of this application, the one or more downlink carriers may be a universal set of the downlink carrier set, or may be a subset of the downlink carrier set.

It should further be understood that steps S411 to S413 may be performed before or after step S420.

Specifically, before or after sending Msg1, the terminal device performs measurement on the one or more downlink carriers in the downlink carrier set by using an NRS to obtain an SINR estimate. The estimate corresponds to a quantity of repetition times that is required for an NPDCCH in a specific downlink control information (DCI) format to reach a block error rate (BLER) of 1%.

When a downlink carrier on which Msg2 is located belongs to the one or more carriers, channel quality of the downlink carrier on which Msg2 is located may be obtained based on the foregoing description.

If the downlink carrier on which Msg2 is located does not belong to the one or more carriers, in a RACH process, measurement for the channel quality of the downlink carrier on which Msg2 is located may be completed before or after Msg1 is sent. If the measurement is performed before Msg1 is sent, the terminal device needs to perform measurement on each of the one or more downlink carriers in the downlink carrier set that is used for random access and that is configured in the system message; and then store the channel quality of each downlink carrier. After the terminal device sends Msg1, a location of the downlink carrier on which Msg2 is located may be determined. The channel quality corresponding to the downlink carrier on which Msg2 is located may be determined from the stored channel quality of the plurality of downlink carriers based on the location of the downlink carrier. It is because before sending Msg1, the terminal device does not know a specific carrier on which Msg2 is sent.

It should be understood that the one or more carriers may include the downlink carrier on which Msg2 is located. For example, 15 downlink carriers used for a RACH/paging are configured in a system message, and only five downlink carriers are associated with the RACH. The terminal device determines, from the 15 downlink carriers, that 10 downlink carriers other than the five downlink carriers associated with the RACH are the one or more carriers. In this case, before the terminal device sends Msg1, if the terminal device measures the channel quality of the downlink carrier on which Msg2 is located, the terminal device may perform measurement on all the five downlink carriers associated with the RACH. Then, after the terminal device determines a specific carrier on which Msg2 is sent, the terminal device may determine the corresponding channel quality of the downlink carrier on which Msg2 is carried.

If the measurement is performed after Msg1 is sent, the terminal device determines a location of the downlink carrier on which Msg2 is located, and the terminal device performs measurement on the downlink carrier by using an NRS. Optionally, the terminal device may perform measurement by using a cell reference signal (CRS), Msg2, or an NPDCCH for scheduling Msg2, to obtain the channel quality corresponding to the downlink carrier.

It should be understood that, after the terminal device sends Msg1, if the terminal device performs measurement on the downlink carrier on which Msg2 is located, the terminal device may directly perform measurement on the downlink carrier on which Msg2 is carried, even if the one or more downlink carriers do not include the downlink carrier on which Msg2 is carried.

Table 1 shows NPDCCH transmission parameters for reporting channel quality.

TABLE 1

| NPDCCH transmission parameters for reporting channel quality | |
|---|---|
| Parameters (parameters) | Values (values) |
| DCI format | Format N1 |
| Quantity of information bits (number of information bits (excluding CRC)) | 23 bits |
| System bandwidth (system bandwidth) | 200 kHz |
| Antenna configuration (antenna configuration) | 2 × 1 |
| Aggregation level | 2 |

TABLE 1-continued

NPDCCH transmission parameters for
reporting channel quality

| Parameters (parameters) | Values (values) |
|---|---|
| (aggregation level) Discontinuous reception (discontinuous reception, DRX) | OFF |

S430. The network device sends the random access process message 2 (Msg2) to the terminal device, and the terminal device receives Msg2 sent by the network device.

S440. The terminal device sends a random access process message 3 (Msg3) to the network device, and the network device receives Msg3 sent by the terminal device.

Optionally, Msg3 includes first information. The first information includes information used to indicate channel quality of one or more downlink carriers with best channel quality.

For example, 15 downlink carriers used for a RACH/paging are configured in a system message, and only five downlink carriers are associated with the RACH. The terminal device may determine the five downlink carriers as the one or more carriers in the downlink carrier set, and measure channel quality of the five downlink carriers. The terminal device may add, into Msg3, information about channel quality of a downlink carrier with best channel quality in the five downlink carriers; or may add, into Msg3, information about channel quality of first two downlink carriers with best channel quality in the five downlink carriers.

Optionally, the first information further includes information used to indicate a location of the one or more downlink carriers.

Optionally, Msg3 includes second information. The second information includes the information used to indicate the channel quality of the downlink carrier for carrying Msg2.

S450. The network device sends a random access process message 4 (Msg4) to the terminal device, and the terminal device receives Msg4 sent by the network device.

Herein, Msg4 may include an RRCConnectionReconfiguration-NB message, an RRCConnectionReestablishment-NB message, an RRCConnectionResume-NB message, or an RRCConnectionSetup-NB message.

Optionally, Msg4 includes information used to indicate one or more downlink carriers with best channel quality.

Specifically, the network device may indicate, in Msg4 to the terminal device, the location of the one or more downlink carriers with best channel quality, and the terminal device may subsequently receive a downlink channel (for example, an NPDCCH and an NPDSCH) on the one or more downlink carriers.

Figure 7:
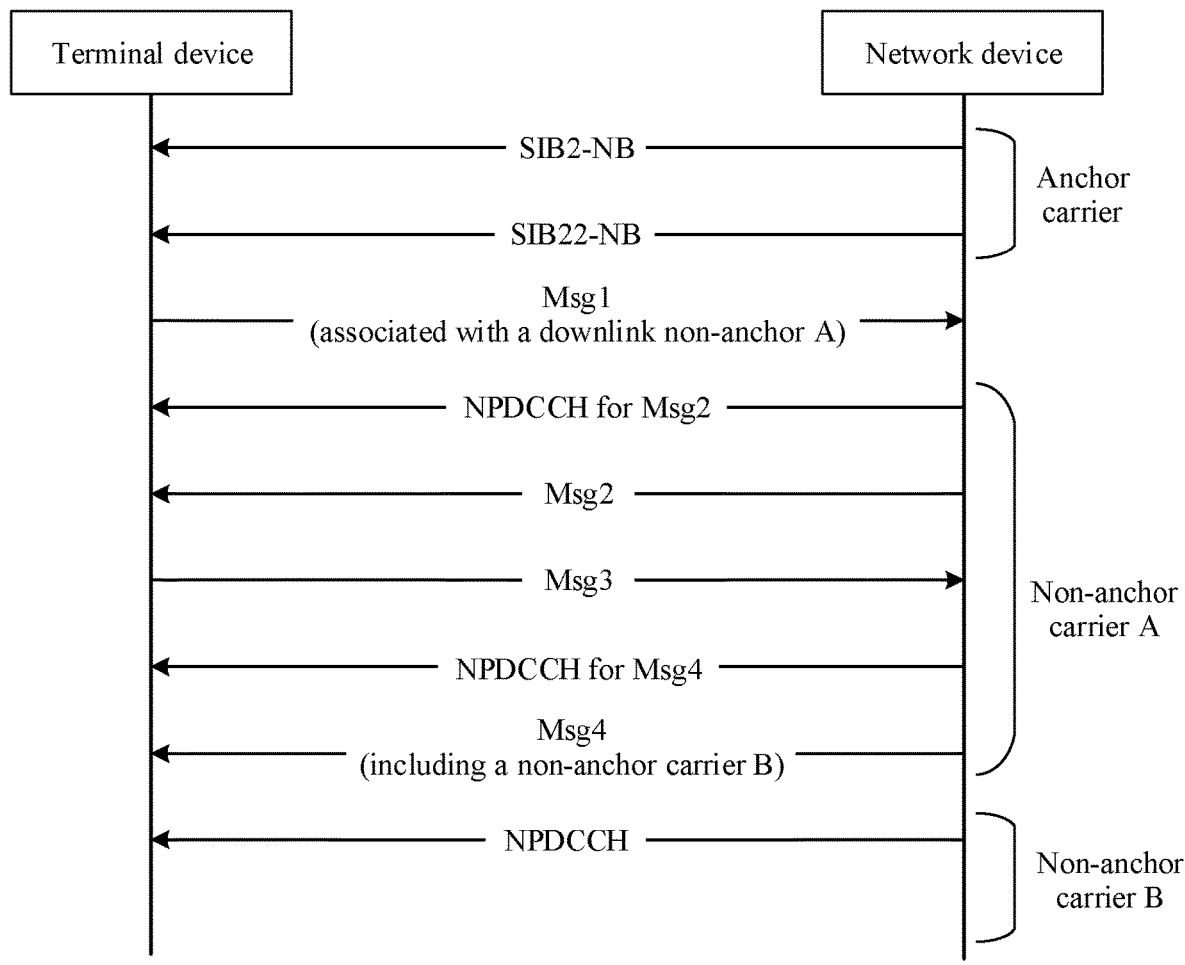
FIG. 7 is a schematic flowchart of another channel quality measurement method according to an embodiment of this application.

In an embodiment, FIG. 7 is a flowchart in which the terminal device receives a system message and enters a connected mode according to an embodiment of this application. As shown in FIG. 7, before the terminal device sends Msg1, for a downlink, the terminal device receives the NPDCCH or the NPDSCH on an anchor carrier. The terminal device selects to send an uplink PRACH on the first uplink carrier in a preset probability based on configuration in the SIB2 and the SIB22; determines a corresponding coverage level by comparing an NRSRP and an NRSRP threshold; determines a specific NPRACH resource on which Msg1 is sent on the first uplink carrier; and determines, based on the configuration information in the SIB2 or the SIB22, a non-anchor carrier A corresponding to the selected uplink PRACH resource. In this way, the terminal device learns that the NPDCCH and the NPDSCH corresponding to Msg2 in the RACH process, the NPDCCH for scheduling retransmission of Msg3, and an NPDCCH and an NPDSCH corresponding to Msg4 are all sent on the non-anchor carrier A.

The terminal device reports, in Msg3, downlink channel quality of the non-anchor carrier A on which Msg2 is located. This helps optimize resource allocation of an NPDCCH for scheduling retransmission of Msg3 and an NPDCCH and an NPDSCH for carrying Msg4, thereby improving downlink resource efficiency.

The network device may configure a non-anchor downlink carrier B in Msg4 for the terminal device, and the terminal device subsequently receives the NPDCCH and the NPDSCH on the non-anchor downlink carrier B.

In Msg3, the terminal device reports a carrier location of the one or more downlink carriers with best channel quality after measurement in the downlink carrier set, and the downlink channel quality corresponding to the carrier. Based on this result, the network device may allocate a downlink carrier with best channel quality to the terminal device by using Msg4, to implement frequency selective scheduling. In addition, based on the downlink channel quality of the carrier, resource allocation of an NPDCCH and an NPDSCH on this carrier can be optimized, thereby improving downlink resource efficiency.

Figure 8:
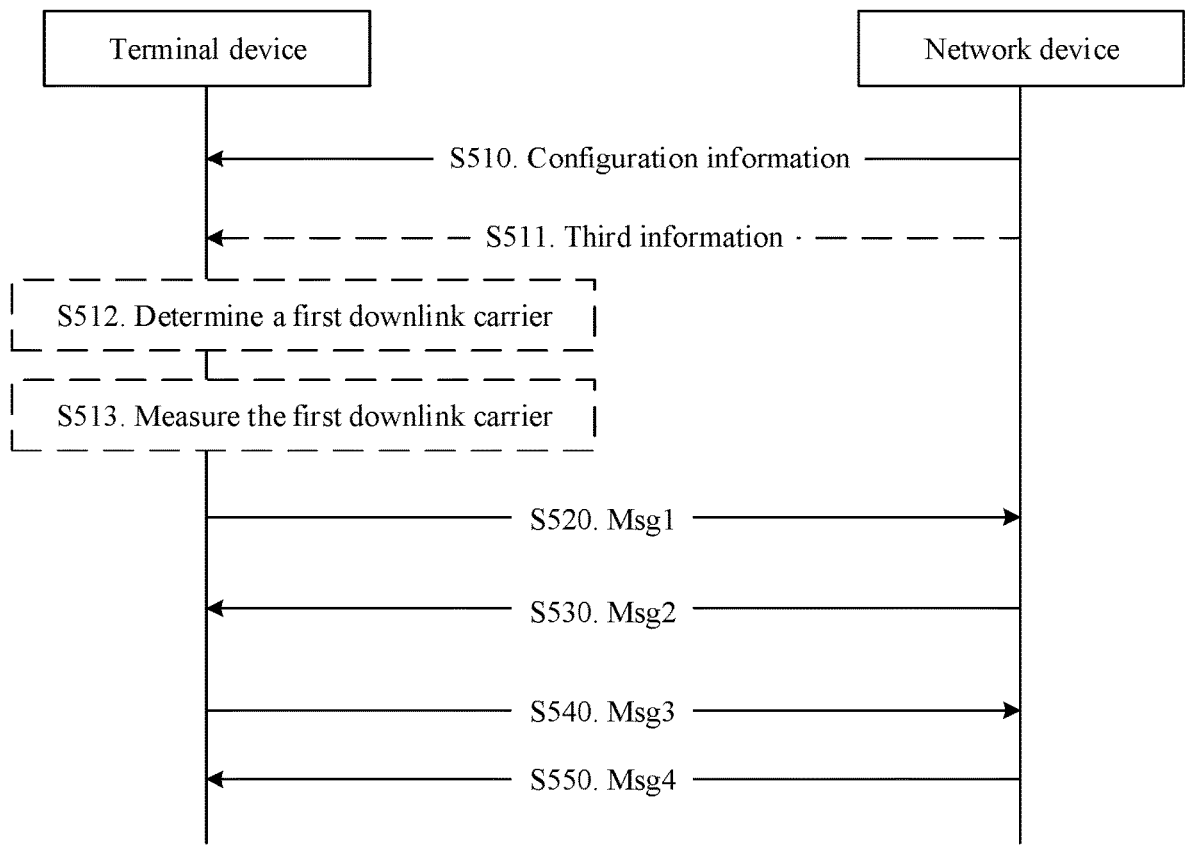
FIG. 8 is a schematic flowchart of another channel quality measurement method according to an embodiment of this application.

With reference to FIG. 6 and FIG. 7, the foregoing describes the channel quality measurement method 300 according to an embodiment of this application. In the method 300, the terminal device may report the channel quality and the location information of the one or more downlink carriers with best channel quality. With reference to FIG. 8, the following describes a method 500 according to an embodiment of this application. In the method 500, the network device may indicate, to the terminal device, a downlink carrier on which measurement needs to be performed.

FIG. 8 is a schematic flowchart of a channel quality measurement method 500 according to an embodiment of this application. As shown in FIG. 8, the method 500 includes the following steps:

S510. A network device sends configuration information to a terminal device, and the terminal device receives the configuration information sent by the network device. The configuration information is used to configure a downlink carrier set.

It should be understood that step S510 is the same as step S410. For brevity, details are not described herein again.

S520. The terminal device sends a random access process message 1 (Msg1) to the network device, and the network device receives Msg1 sent by the terminal device.

Optionally, before the terminal device sends the random access process message 1 (Msg1) to the network device, the method 500 further includes the following steps:

S511. The network device sends third information to the terminal device, and the terminal device receives the third information sent by the network device. The third information is used to indicate a first downlink carrier.

S512. The terminal device determines the first downlink carrier from the downlink carrier set based on the third information.

Optionally, the third information is downlink control information DCI.

Optionally, the DCI is DCI corresponding to an NPDCCH order, and the DCI is used for triggering a random access procedure by using the NPDCCH order.

In this embodiment of this application, the DCI corresponding to the NPDCCH order may be used to indicate one or more of a location of an uplink carrier on which Msg1 is sent, a location of a subcarrier, or a quantity of repetition times to the terminal device.

Optionally, the DCI corresponding to the NPDCCH order may be further used to indicate one or more downlink carriers. After receiving the DCI, the terminal device may perform measurement on the one or more downlink carriers indicated by the DCI corresponding to the NPDCCH order.

It should be understood that in this embodiment of this application, for NB-IOT, the DCI corresponding to the NPDCCH order is in a DCI format N1, and spare bits or reserved bits in the DCI with format N1 may be used to indicate the first downlink carrier.

Optionally, the third information is a system message. The third message is a SIB2-NB, or a SIB22-NB, or a SIB2-NB and a SIB22-NB. A specific indication manner for the third information may be as follows:

Manner 1: The network device may indicate the first downlink carrier for each uplink carrier used for random access, and the terminal device may determine the first downlink carrier by determining the uplink carrier for sending Msg1.

Manner 2: The network device may indicate the first downlink carrier for each random access resource on each uplink carrier used for random access, and the terminal device may determine the first downlink carrier by determining the random access resource for sending Msg1.

Manner 3: The network device may indicate the first downlink carrier for each subcarrier of each random access resource on each uplink carrier used for random access, and the terminal device may determine the first downlink carrier by determining the subcarrier used for sending Msg1.

S513. The terminal device measures channel quality of the first downlink carrier.

S530. The network device sends a random access process message 2 (Msg2) to the terminal device, and the terminal device receives Msg2 sent by the network device.

Optionally, Msg2 includes the third information. The third information is used to indicate one or more downlink carriers. After receiving Msg2, the terminal device may learn that the network device expects the terminal device to measure channel quality of the one or more downlink carriers.

It should be understood that if the third information is indicated in Msg2 to the terminal device, step S512 may be performed after step S530.

It should be understood that, in this embodiment of this application, the third information may be sent by the network device to the terminal device before the terminal device sends Msg1, or may be sent in Msg2 to the terminal device, or may be indicated to the terminal device in another manner. This embodiment of this application is not limited to the foregoing two manners.

S540. The terminal device sends a random access process message 3 (Msg3) to the network device, and the network device receives Msg3 sent by the terminal device.

Optionally, Msg3 includes first information. The first information includes information used to indicate the channel quality of the one or more downlink carriers.

Specifically, after receiving the third information, the terminal device may perform measurement on the one or more downlink carriers indicated in the third information, and Msg3 carries the information about the channel quality of the one or more downlink carriers.

In this embodiment of this application, the terminal device reports channel quality of a downlink carrier specified by the network device. The network device determines a load status of each carrier based on channel quality reported by all terminal devices. For example, based on statistical data, a carrier with relatively good downlink channel quality has relatively light load, and a carrier with relatively poor downlink channel quality has relatively heavy load. This helps the network device implement load balance. For example, some services on a carrier with relatively heavy load are allocated to a carrier with relatively light load.

Optionally, Msg3 includes second information. The second information includes information used to indicate channel quality of a downlink carrier for carrying Msg2.

In this embodiment of this application, the terminal device reports, in Msg3, the channel quality of the downlink carrier on which Msg2 is located. This helps optimize resource allocation of an NPDCCH for scheduling retransmission of Msg3 and an NPDCCH and an NPDSCH for carrying Msg4, thereby improving downlink resource efficiency.

S550. The network device sends a random access process message 4 Msg4 to the terminal device, and the terminal device receives Msg4 sent by the network device.

Optionally, the method 500 further includes that the network device determines load of the first downlink carrier based on the channel quality of the first downlink carrier; and the network device adjusts the load of the first downlink carrier.

For example, there are 1000 terminal devices in a system. The network device may indicate a downlink carrier A to 500 terminal devices, and indicate a downlink carrier B to the other 500 terminal devices. The terminal devices feed back channel quality of the corresponding downlink carriers. The network device determines channel quality QA that is of the downlink carrier A and that is obtained through measurement by 90% of the terminal devices. The network device determines channel quality QB that is of the downlink carrier B and that is obtained through measurement by 90% of the terminal devices. If QA is better than QB, the network device may determine that load of the downlink carrier A is lighter than load of the downlink carrier B. To implement load balance, the network device may allocate some services of the downlink carrier B with the heavier load to the downlink carrier A with the lighter load.

The foregoing describes the method 500 in this embodiment of this application with reference to FIG. 8. The downlink carrier measured by the terminal device in the method 500 may be indicated by the network device. The following describes a method 600 with reference to FIG. 9. The terminal device in the method 600 may determine, according to some predefined rules, a downlink carrier on which measurement needs to be performed.

Figure 9:
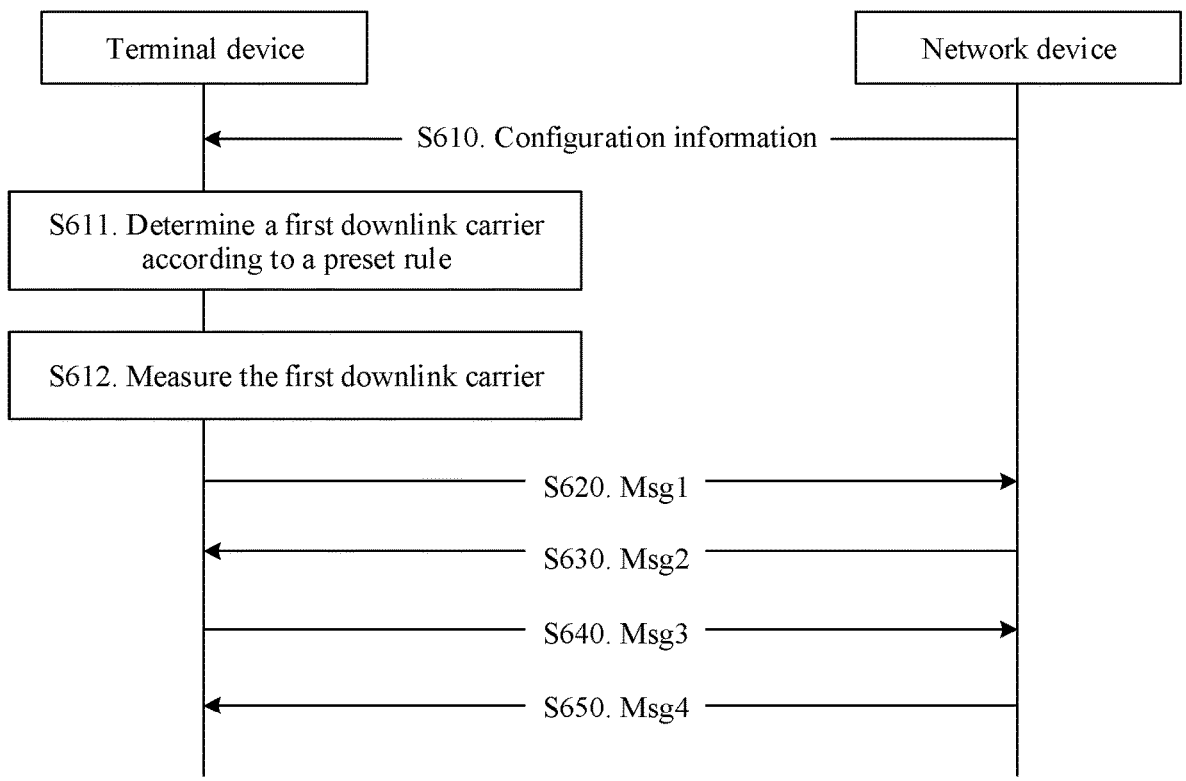
FIG. 9 is a schematic flowchart of another channel quality measurement method according to an embodiment of this application.

FIG. 9 is a schematic flowchart of a channel quality measurement method 600 according to an embodiment of this application. As shown in FIG. 9, the method 600 includes the following steps:

S610. A network device sends configuration information to a terminal device, and the terminal device receives the configuration information sent by the network device. The configuration information is used to configure a downlink carrier set.

Optionally, the downlink carrier set includes one or more downlink carriers.

Optionally, the configuration information is carried in a system message. The system message may be a SIB22-NB or another system message.

Optionally, the downlink carrier set may include a downlink carrier that is used for a RACH and that is configured in the SIB22-NB or a downlink carrier that is used for paging and that is configured in the SIB22-NB.

Optionally, the downlink carrier set may include the downlink carrier that is used for the RACH and that is configured in the SIB22-NB or a downlink carrier set that is used for paging and that is configured in the SIB22-NB. In other words, the downlink carrier set may include the downlink carrier that is used for the random access channel (RACH) and that is configured in the SIB22-NB or some of the downlink carriers that are used for paging and that are configured in the SIB22-NB.

Optionally, the downlink carrier set may include a downlink carrier that is associated with a RACH and that is configured in the SIB22-NB.

Optionally, the downlink carrier set may include a downlink carrier on which measurement is to be performed and that is configured by the network device.

S611. The terminal device determines a first downlink carrier from the downlink carrier set according to a preset rule.

Optionally, before the terminal device determines the first downlink carrier from the downlink carrier set according to the preset rule, the method 600 further includes that
the terminal device determines one or more downlink carriers from the downlink carrier set.

For example, the downlink carrier set may be a downlink carrier that is used for random access or paging and that is configured in the system message. If 15 downlink carriers used for random access or paging are configured in the system message, the terminal device may determine the 15 downlink carriers as the one or more downlink carriers.

For another example, the downlink carrier set is a downlink carrier that is associated with the RACH and that is configured in the system message. If 15 downlink carriers used for random access or paging are configured in the system message, and only five downlink carriers are associated with the RACH, the terminal device may determine the five downlink carriers as the one or more downlink carriers.

It should be understood that the one or more downlink carriers may be a universal set or a subset of the downlink carrier set.

That the terminal device determines the first downlink carrier from the downlink carrier set according to the preset rule includes that
the terminal device determines the first downlink carrier from the one or more downlink carriers according to the preset rule.

Optionally, the terminal device may use, as a downlink carrier, a paging carrier in the one or more downlink carriers after measurement. A manner in which the terminal device determines the paging carrier is the conventional technology.

The paging carrier has a minimum index n that meets the following formula:

$$\text{floor}(UE\_ID/(N*Ns)) \bmod W < W(0) + W(1) + \ldots + W(n)$$

Herein, UE_ID=IMSI mod 4096 or UE_ID=IMSI mod 16384, W(n) is a weight of a carrier n, N=min(T, nB), Ns=max(1, nB/T), and T and nB are configured by the network device. In addition, the IMSI is given as a sequence of decimal integer numbers, and may be used as an identifier of the terminal device.

Optionally, the terminal device may determine the first downlink carrier from the one or more downlink carriers based on identification information of the terminal device.

For example, the terminal device may obtain an index of a downlink carrier based on a modulo of an identifier (IMSI) of the terminal device and a value; and then determine, from the downlink carrier set, the downlink carrier corresponding to the index of the downlink carrier. The value is a preset value that may be less than or equal to a quantity of carriers in the downlink carrier set. Alternatively, the value is a quantity of carriers in the downlink carrier set.

For another example, the one or more downlink carriers include five downlink carriers, and carrier indexes are 0 to 4 according to a sequence. The terminal device performs modulo operation on the IMSI and M, and obtains the carrier index of 4. In this case, the terminal device determines that the carrier whose carrier index is "4" in the one or more downlink carriers is the first downlink carrier.

Optionally, the terminal device may determine a downlink carrier based on a random access resource location. For example, there is a mapping relationship between the random access resource location and the downlink carrier. The mapping relationship includes the following manners:

Manner 1: Each uplink carrier used for random access is mapped to one downlink carrier. The terminal device may determine the first downlink carrier by determining the uplink carrier for sending Msg1.

Manner 2: Each random access resource on each uplink carrier used for random access is mapped to one downlink carrier. The terminal device may determine the first downlink carrier by determining the random access resource for sending Msg1.

Manner 3: Each subcarrier of each random access resource on each uplink carrier used for random access is mapped to one downlink carrier. The terminal device may determine the first downlink carrier by determining the subcarrier for sending Msg1.

It should be understood that in this embodiment of this application, the terminal device may further determine the first downlink carrier according to another preset rule. This embodiment of this application is not limited to the foregoing two manners.

S612. The terminal device measures channel quality of the first downlink carrier.

S620. The terminal device sends the random access process message 1 (Msg1) to the network device, and the network device receives Msg1 sent by the terminal device.

S630. The network device sends a random access process message 2 (Msg2) to the terminal device, and the terminal device receives Msg2 sent by the network device.

S640. The terminal device sends a random access process message 3 (Msg3) to the network device, and the network device receives Msg3 sent by the terminal device.

Optionally, Msg3 includes first information. The first information includes information used to indicate the channel quality that is of the first downlink carrier and that is determined by the terminal device according to the preset rule.

Optionally, the first information further includes information used to indicate a location of the first downlink carrier.

Specifically, after determining the first downlink carrier according to the preset rule and performing measurement on the first downlink carrier, the terminal device may add the information about the channel quality of the first downlink carrier into Msg3.

In this embodiment of this application, the terminal device reports the channel quality of the downlink carrier that is determined by the terminal device according to the preset rule. The network device determines a load status of each carrier based on channel quality reported by all terminal devices. For example, based on statistical data, a carrier with relatively good downlink channel quality has relatively light load, and a carrier with relatively poor downlink channel quality has relatively heavy load. This helps the network device implement load balance. For example, some services on a carrier with relatively heavy load are allocated to a carrier with relatively light load.

Optionally, Msg3 includes second information. The second information includes information used to indicate channel quality of a downlink carrier for carrying Msg2.

In this embodiment of this application, the terminal device reports, in Msg3, the channel quality of the downlink carrier on which Msg2 is located. This helps optimize resource allocation of an NPDCCH for scheduling retransmission of Msg3 and an NPDCCH and an NPDSCH for carrying Msg4, thereby improving downlink resource efficiency.

S650. The network device sends a random access process message 4 (Msg4) to the terminal device, and the terminal device receives Msg4 sent by the network device.

Optionally, the method 600 further includes that the network device determines load of the first downlink carrier based on the channel quality of the first downlink carrier; and the network device adjusts the load of the first downlink carrier.

For the descriptions in the method 300 to the method 600, the terminal device may directly indicate, in the first information and the second information, the channel quality of the first downlink carrier and the channel quality of the downlink carrier for carrying Msg2; or may indirectly perform indication in another manner.

In a possible implementation, when the terminal device reports the first information and the second information, the first information may include the information used to indicate the channel quality of the first downlink carrier, and the second information may include information used to indicate a deviation of the channel quality of the downlink carrier on which Msg2 is located, relative to the channel quality of the first downlink carrier. The network device may determine, based on the deviation in the second information and the channel quality in the first information, the channel quality of the downlink carrier on which Msg2 is located.

In another possible implementation, when the terminal device reports the first information and the second information, the second information may include the information used to indicate the channel quality of the downlink carrier on which Msg2 is located, and the first information may include information used to indicate a deviation of the channel quality of the first downlink carrier relative to the channel quality of the downlink carrier on which Msg2 is located. The channel quality of the first downlink carrier may be determined based on the deviation in the first information and the channel quality in the second information.

Figure 10:
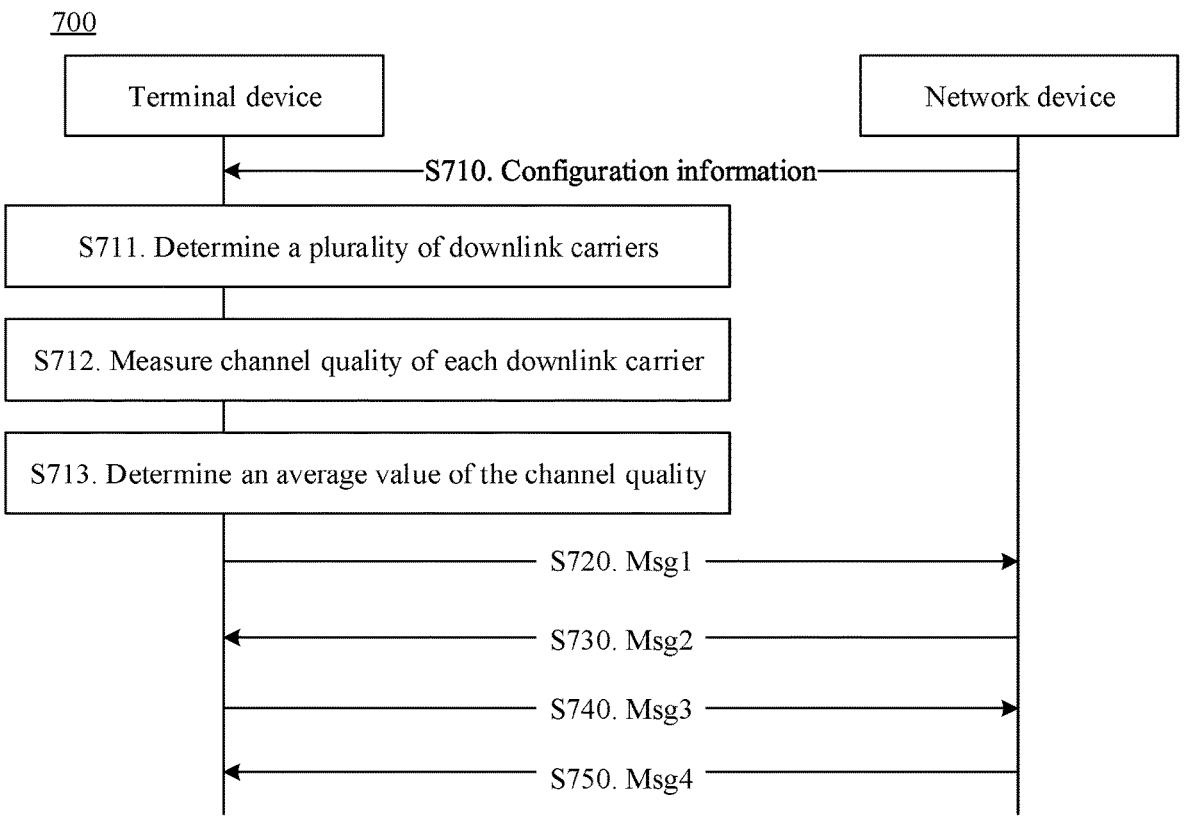
FIG. 10 is a schematic flowchart of another channel quality measurement method according to an embodiment of this application.

The foregoing describes the method 600 in this embodiment of this application with reference to FIG. 9. In the method 600, the terminal device may determine, according to the preset rule, the channel quality of the downlink carrier on which measurement needs to be performed, and report the channel quality to the network device. The network device may implement load balance based on the channel quality. With reference to FIG. 10, the following describes a method 700 in this embodiment of this application. In the method 700, the terminal device may report an average value of channel quality of a plurality of downlink carriers. This helps a network device determine a load status of a current system.

FIG. 10 is a schematic flowchart of a channel quality measurement method 700 according to an embodiment of this application. As shown in FIG. 10, the method 700 includes the following steps:

S710. A network device sends configuration information to a terminal device, and the terminal device receives the configuration information sent by the network device. The configuration information is used to configure a downlink carrier set.

S711. The terminal device determines a plurality of downlink carriers from the downlink carrier set.

It should be understood that a process in which the terminal device determines the plurality of downlink carriers from the downlink carrier set is similar to a process in the foregoing method 600. For brevity, details are not described herein again.

S712. The terminal device performs measurement on the plurality of downlink carriers in the downlink carrier set to obtain channel quality of each downlink carrier.

S713. The terminal device determines an average value of the channel quality of the plurality of downlink carriers.

S720. The terminal device sends a random access process message 1 (Msg1) to the network device, and the network device receives Msg1 sent by the terminal device.

S730. The network device sends a random access process message 2 (Msg2) to the terminal device, and the terminal device receives Msg2 sent by the network device.

S740. The terminal device sends a random access process message 3 (Msg3) to the network device, and the network device receives Msg3 sent by the terminal device.

Optionally, Msg3 includes fourth information. The fourth information includes information used to indicate the average value of the channel quality of the plurality of downlink carriers.

In this embodiment of this application, the terminal device reports the average value that is of the channel quality of the plurality of downlink carriers and that is measured by the terminal device. This helps the network device learn of a load status of a current system.

Optionally, Msg3 includes second information. The second information includes information used to indicate channel quality of a downlink carrier for carrying Msg2.

In this embodiment of this application, the terminal device reports, in Msg3, the channel quality of the downlink carrier on which Msg2 is located. This helps optimize resource allocation of an NPDCCH for scheduling retransmission of Msg3 and an NPDCCH and an NPDSCH for carrying Msg4, thereby improving downlink resource efficiency.

With reference to FIG. 4 to FIG. 10, the foregoing describes in detail the channel quality measurement method provided in the embodiments of this application. With reference to the accompanying drawings, the following describes in detail a channel quality measurement apparatus provided in the embodiments of this application.

The embodiments of this application further provide an apparatus for implementing any one of the foregoing methods. For example, an apparatus is provided. The apparatus includes units (or means) configured to implement steps performed by a terminal in any one of the foregoing methods. For another example, another apparatus is further provided. The apparatus includes units (or means) configured to implement steps performed by a network device in any one of the foregoing methods.

Figure 11:
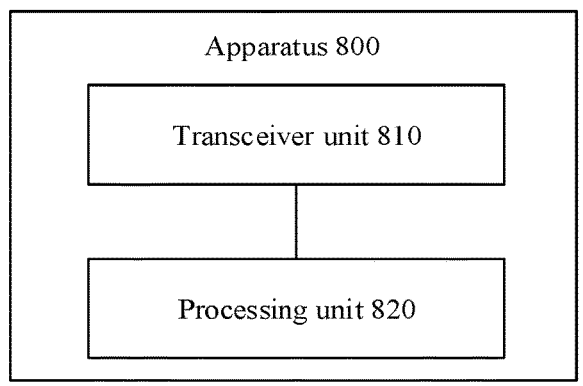
FIG. 11 is a schematic block diagram of a channel quality measurement apparatus according to an embodiment of this application.

FIG. 11 is a schematic block diagram of a channel quality measurement apparatus 800 according to an embodiment of this application. As shown in FIG. 11, the channel quality measurement apparatus 800 may include a transceiver unit 810 and a processing unit 820.

In a possible design, the channel quality measurement apparatus may be the terminal device in the method 300 to the method 700, or may be a chip configured in the terminal device.

Specifically, the transceiver unit 810 is configured to receive configuration information sent by a network device.

The processing unit 820 is configured to determine a first downlink carrier from a downlink carrier set.

The transceiver unit 810 is further configured to send a random access process message 3 (Msg3) to the network device. Herein, Msg3 includes first information. The first information includes information used to indicate channel quality of the first downlink carrier. The channel quality is used to provide information about a first repetition level to the network device. The first repetition level is a minimum repetition level required when transmission performed on a downlink channel based on a preset transmission parameter meets a preset block error rate.

Optionally, the transceiver unit 810 is further configured to: before sending Msg3 to the network device,
send a random access process message 1 (Msg1) to the network device; and
receive a random access process message 2 (Msg2) sent by the network device.

Herein, Msg3 further includes second information. The second information includes information used to indicate channel quality of a second downlink carrier. The second downlink carrier is used to carry Msg2. The first downlink carrier and the second downlink carrier are different downlink carriers.

Optionally, that the processing unit 820 is configured to determine the first downlink carrier from the downlink carrier set includes that
the processing unit 820 is configured to: determine one or more carriers from the downlink carrier set;
measure channel quality of each of the one or more downlink carriers; and
determine the first downlink carrier based on the channel quality of each downlink carrier, where the first downlink carrier is one or more downlink carriers with best channel quality in the one or more downlink carriers.

It should be understood that the channel quality measurement apparatus 800 may correspond to the terminal device in the channel quality measurement method 400 according to the embodiment of this application, and the channel quality measurement apparatus 800 may include units used for the method performed by the terminal device for performing the channel quality measurement method 400. In addition, the units in the channel quality measurement apparatus 800 and the foregoing other operations and/or functions are separately intended to implement a corresponding procedure of the channel quality measurement method 400. For a specific process in which the units perform the foregoing corresponding steps, refer to the descriptions in the foregoing method embodiments with reference to FIG. 6 and FIG. 7. For brevity, details are not described herein again.

Optionally, that the processing unit 820 is configured to determine the first downlink carrier from the downlink carrier set includes that
the processing unit 820 is configured to determine the first downlink carrier from the downlink carrier set according to a preset rule.

Optionally, that the processing unit 820 is configured to determine the first downlink carrier from the downlink carrier set according to the preset rule includes that
the processing unit 820 is configured to determine a paging carrier in the downlink carrier set as the first downlink carrier; or
the processing unit 820 is configured to determine the first downlink carrier from the downlink carrier set based on identification information of the terminal device.

It should be understood that the channel quality measurement apparatus 800 may correspond to the terminal device in the channel quality measurement method 600 according to the embodiment of this application, and the channel quality measurement apparatus 800 may include units used for the method performed by the terminal device for performing the channel quality measurement method 600. In addition, the units in the channel quality measurement apparatus 800 and the foregoing other operations and/or functions are separately intended to implement a corresponding procedure of the channel quality measurement method 600. For a specific process in which the units perform the foregoing corresponding steps, refer to the description in the foregoing method embodiment with reference to FIG. 9. For brevity, details are not described herein again. Optionally, the first information further includes information used to indicate a location of the first downlink carrier.

Optionally, the transceiver unit 810 is further configured to receive third information sent by the network device. The third information is used to indicate the first downlink carrier.

That the processing unit 820 is configured to determine the first downlink carrier from the downlink carrier set includes that
the processing unit 820 is configured to determine the first downlink carrier from the downlink carrier set based on the third information.

It should be understood that the channel quality measurement apparatus 800 may correspond to the terminal device in the channel quality measurement method 500 according to the embodiment of this application, and the channel quality measurement apparatus 800 may include units used for the method performed by the terminal device for performing the channel quality measurement method 500. In addition, the units in the channel quality measurement apparatus 800 and the foregoing other operations and/or functions are separately intended to implement a corresponding procedure of the channel quality measurement method 500. For a specific process in which the units perform the foregoing corresponding steps, refer to the description in the foregoing method embodiment with reference to FIG. 8. For brevity, details are not described herein again.

Optionally, the transceiver unit 810 is configured to receive the configuration information sent by the network device. The configuration information is used to configure the downlink carrier set.

The processing unit 820 is configured to determine a plurality of downlink carriers from the downlink carrier set.

The processing unit 820 is further configured to: measure each downlink carrier in the plurality of downlink carriers to obtain channel quality of each downlink carrier; and determine an average value of the channel quality of the plurality of downlink carriers.

The transceiver unit 810 is further configured to send the random access process message 3 Msg3 to the network device. Herein, Msg3 includes the average value.

It should be understood that the channel quality measurement apparatus 800 may correspond to the terminal device in the channel quality measurement method 700 according to the embodiment of this application, and the channel quality measurement apparatus 800 may include units used for the method performed by the terminal device for performing the channel quality measurement method 700. In addition, the units in the channel quality measurement apparatus 800 and the foregoing other operations and/or functions are separately intended to implement a corresponding procedure of the channel quality measurement method 700. For a specific process in which the units perform the foregoing corresponding steps, refer to the description in the foregoing method embodiment with reference to FIG. 10. For brevity, details are not described herein again.

Figure 12:
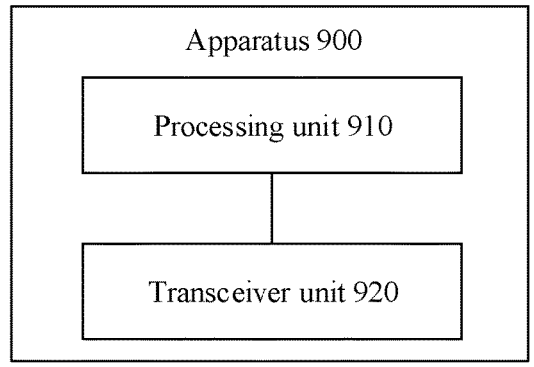
FIG. 12 is a schematic block diagram of another channel quality measurement apparatus according to an embodiment of this application.

FIG. 12 is a schematic block diagram of a channel quality measurement apparatus 900 according to an embodiment of this application. As shown in FIG. 12, the channel quality measurement apparatus 900 may include a processing unit 910 and a transceiver unit 920.

In a possible design, the channel quality measurement apparatus may be the network device in the method 300 to the method 700, or may be a chip configured in the network device.

Specifically, the processing unit 910 is configured to determine configuration information. The configuration information is used to configure a downlink carrier set. The downlink carrier set includes a first downlink carrier.

The transceiver unit 920 is configured to send the configuration information to a terminal device.

The transceiver unit 920 is further configured to receive a random access process message 3 (Msg3) sent by the terminal device. Herein, Msg3 includes first information. The first information includes information used to indicate channel quality of the first downlink carrier. The channel quality is used to provide information about a first repetition level to the apparatus. The first repetition level is a minimum repetition level required when transmission performed on a downlink channel based on a preset transmission parameter meets a preset block error rate.

Optionally, the transceiver unit 920 is further configured to: before receiving Msg3 sent by the terminal device,
  receive a random access process message 1 (Msg1) sent by the terminal device; and
  send a random access process message 2 (Msg2) to the terminal device.

Herein, Msg3 further includes second information. The second information includes information used to indicate channel quality of a second downlink carrier. The second downlink carrier is used to carry Msg2. The first downlink carrier and the second downlink carrier are different downlink carriers.

Optionally, the first downlink carrier is one or more downlink carriers with best channel quality for the terminal device in one or more carriers in the downlink carrier set.

Optionally, the transceiver unit 920 is further configured to: after Msg3 is sent, send sixth information to the terminal device. The sixth information is used to indicate a location of the first downlink carrier.

It should be understood that the channel quality measurement apparatus 900 may correspond to the network device in the channel quality measurement method 400 according to the embodiment of this application, and the channel quality measurement apparatus 900 may include units used for the method performed by the network device for performing the channel quality measurement method 400. In addition, the units in the channel quality measurement apparatus 900 and the foregoing other operations and/or functions are separately intended to implement a corresponding procedure of the channel quality measurement method 400. For a specific process in which the units perform the foregoing corresponding steps, refer to the descriptions in the foregoing method embodiments with reference to FIG. 6 and FIG. 7. For brevity, details are not described herein again.

Optionally, the first downlink carrier is determined by the terminal device according to a preset rule.

It should be understood that the channel quality measurement apparatus 900 may correspond to the network device in the channel quality measurement method 600 according to the embodiment of this application, and the channel quality measurement apparatus 900 may include units used for the method performed by the network device for performing the channel quality measurement method 600. In addition, the units in the channel quality measurement apparatus 900 and the foregoing other operations and/or functions are separately intended to implement a corresponding procedure of the channel quality measurement method 600. For a specific process in which the units perform the foregoing corresponding steps, refer to the description in the foregoing method embodiment with reference to FIG. 9. For brevity, details are not described herein again. Optionally, the first information further includes information used to indicate the location of the first downlink carrier.

Optionally, the transceiver unit 920 is further configured to: before Msg3 is sent, send third information to the terminal device. The third information is used to indicate the first downlink carrier.

Optionally, the processing unit 910 is further configured to:
  determine load of the first downlink carrier based on the channel quality of the first downlink carrier; and
  adjust the load of the first downlink carrier.

It should be understood that the channel quality measurement apparatus 900 may correspond to the network device in the channel quality measurement method 500 according to the embodiment of this application, and the channel quality measurement apparatus 900 may include units used for the method performed by the network device for performing the channel quality measurement method 500. In addition, the units in the channel quality measurement apparatus 900 and the foregoing other operations and/or functions are separately intended to implement a corresponding procedure of the channel quality measurement method 500. For a specific process in which the units perform the foregoing corresponding steps, refer to the description in the foregoing method embodiment with reference to FIG. 8. For brevity, details are not described herein again.

Optionally, the transceiver unit 920 is configured to receive the random access process message 3 (Msg3) sent by the terminal device. Herein, Msg3 includes an average value of channel quality of one or more downlink carriers. The one or more downlink carriers are determined by the terminal device from the downlink carrier set.

It should be understood that the channel quality measurement apparatus 900 may correspond to the network device in the channel quality measurement method 700 according to the embodiment of this application, and the channel quality measurement apparatus 900 may include units used for the method performed by the network device for performing the channel quality measurement method 700. In addition, the units in the channel quality measurement apparatus 900 and the foregoing other operations and/or functions are separately intended to implement a corresponding procedure of the channel quality measurement method 700. For a specific process in which the units perform the foregoing corresponding steps, refer to the description in the foregoing method embodiment with reference to FIG. 10. For brevity, details are not described herein again.

Figure 13:
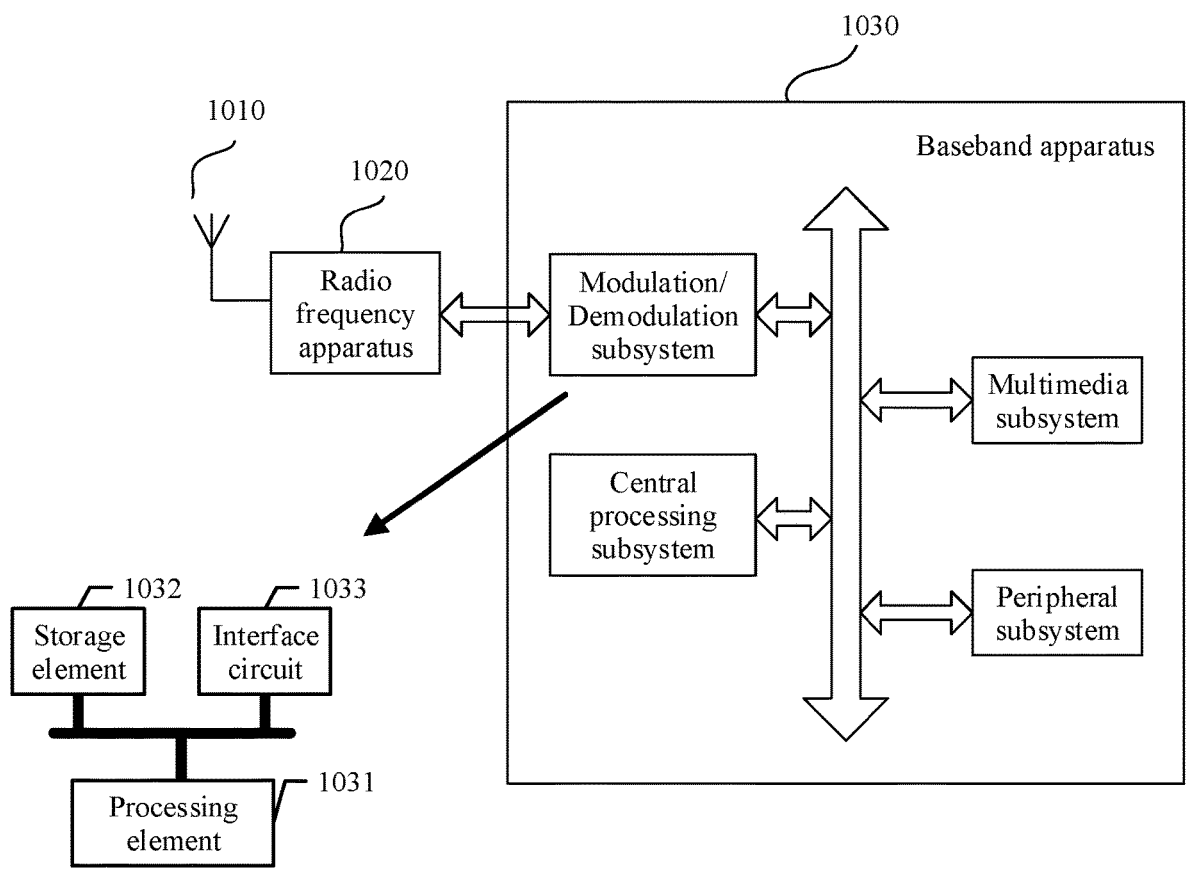
FIG. 13 is a schematic structural diagram of a terminal device according to an embodiment of this application.

FIG. 13 is a schematic structural diagram of a terminal device according to an embodiment of this application. The terminal device may be the terminal device in the foregoing embodiments. The terminal device is configured to implement operations of the terminal device in the foregoing embodiments. As shown in FIG. 13, the terminal device includes an antenna 1010, a radio frequency part 1020, and a signal processing part 1030. The antenna 1010 is connected to the radio frequency part 1020. In a downlink direction, the radio frequency part 1020 receives, by using the antenna 1010, information sent by a network device; and sends, to the signal processing part 1030 for processing, the information sent by the network device. In an uplink direction, the signal processing part 1030 processes the information of the terminal, and sends the processed information to the radio frequency apparatus 1020; and the radio frequency part 1020 processes the information of the terminal device, and then sends the processed information to the network device by using the antenna 1010.

The signal processing part 1030 may include a modulation/demodulation subsystem that is configured to implement processing on data at each communications protocol layer. The signal processing part 1030 may further include a central processing subsystem that is configured to implement processing on a terminal operating system and an application layer. In addition, the signal processing part 1030 may further include another subsystem such as a multimedia subsystem or a peripheral subsystem. The multimedia subsystem is used to implement control on a camera of a terminal device, a screen display, and the like. The peripheral subsystem is used to implement a connection to another device. The modulation/demodulation subsystem may be an independently disposed chip. Optionally, the foregoing apparatus applied to the terminal may be located in the modulation/demodulation subsystem.

The modulation/demodulation subsystem may include one or more processing elements 1031, for example, a controlling CPU and another integrated circuit. In addition, the modulation/demodulation subsystem may further include a storage element 1032 and an interface circuit 1033. The storage element 1032 is configured to store data and a program. However, a program used to implement the method performed by the terminal in the foregoing method may be not stored in the storage element 1032, but stored in a memory outside the modulation/demodulation subsystem. When the program is being used, the program is loaded to and used in the modulation/demodulation subsystem. The interface circuit 1033 is configured to communicate with another subsystem. The foregoing apparatus applied to the terminal may be located in the modulation/demodulation subsystem. The modulation/demodulation subsystem may be implemented by using a chip. The chip includes at least one processing element and an interface circuit. The processing element is configured to perform steps in any method performed by the foregoing terminal device. The interface circuit is configured to communicate with another apparatus. In an implementation, the units in the terminal device for implementing the steps in the foregoing method may be implemented in a form of scheduling a program by the processing element. For example, the apparatus applied to the terminal device includes a processing element and a storage element. The processing element invokes a program stored in the storage element, to perform the method performed by the terminal device in the foregoing method embodiment. The storage element may be a storage element that is on the same chip as the processing unit, that is, an on-chip storage element.

In another implementation, a program used to perform the method performed by the terminal device in the foregoing method may be in a storage element that is on a different chip from the processing unit, that is, an off-chip storage element. In this case, the processing element invokes or loads the program from the off-chip storage element to an on-chip storage element, to invoke and perform the method performed by the terminal in the foregoing method embodiment.

In still another implementation, the units in the terminal for implementing the steps in the foregoing method may be configured as one or more processing elements. The processing elements are disposed in the modulation/demodulation subsystem. The processing element herein may be an integrated circuit such as one or more application-specific integrated circuits (ASIC), one or more digital signal processors (DSP), one or more field programmable gate arrays (FPGA), or a combination of these types of integrated circuits. These integrated circuits may be integrated together to form a chip.

The units in the terminal for implementing the steps in the foregoing method may be integrated together in a form of a system-on-a-chip (SOC). For example, the SOC chip is configured to implement the foregoing method. The at least one processing element and the storage element may be integrated into the chip, and the processing element invokes the program stored in the storage element to implement the foregoing method performed by the terminal. Alternatively, at least one integrated circuit may be integrated into the chip and configured to implement the foregoing method performed by the terminal. Alternatively, with reference to the foregoing implementation, functions of some units are implemented in a form of a program invoked by the processing element, and functions of some units are implemented in a form of an integrated circuit.

It may be learned that the foregoing apparatus applied to the terminal device may include the at least one processing element and the interface circuit. The at least one processing element is configured to perform the method that is performed by the terminal device and that is provided in the foregoing method embodiment. The processing element may perform, in a first manner, that is, in a manner of invoking the program stored in the storage element, some or all steps performed by the terminal; or may perform, in a second manner, that is, in a manner of combining a hardware integrated logical circuit in the processing element with an instruction, some or all steps performed by the terminal device; or may certainly perform, with reference to the first manner and the second manner, some or all steps performed by the terminal.

As described above, the processing element herein may be a general purpose processor, for example, a CPU, or may be one or more integrated circuits configured to implement the foregoing method, for example, one or more ASICs, one or more microprocessors DSPs, one or more FPGAs, or a combination of at least two of these forms of integrated circuits.

The storage element may be a memory, or may be a general term of a plurality of storage elements.

Figure 14:
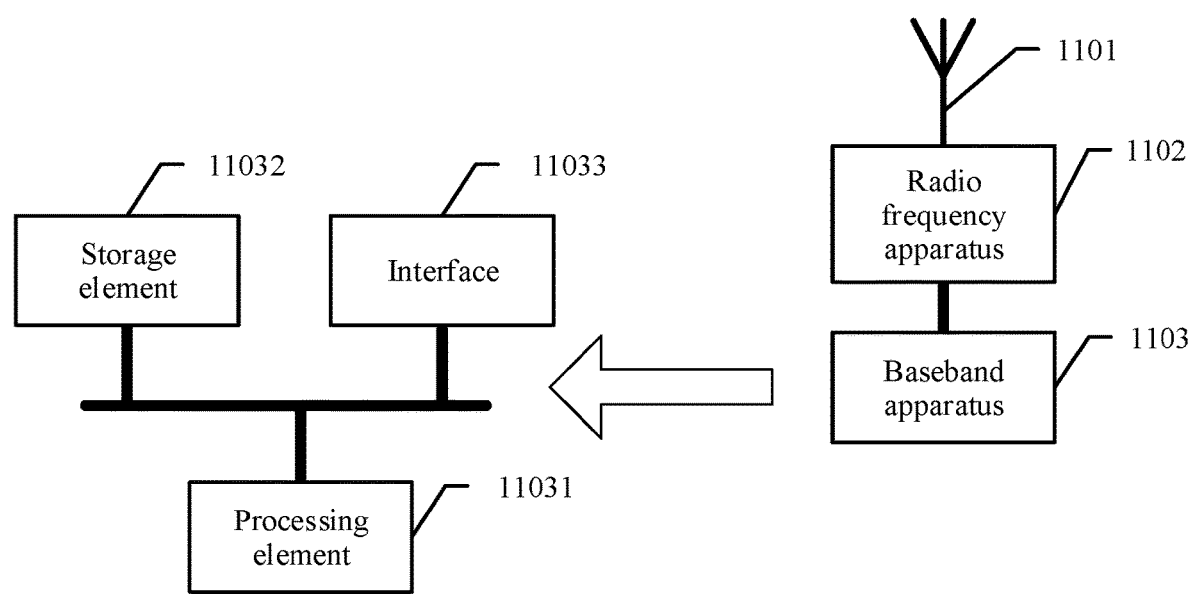
FIG. 14 is a schematic structural diagram of a network device according to an embodiment of this application.

FIG. 14 is a schematic structural diagram of a network device according to an embodiment of this application. The network device may be the network device in the foregoing embodiments. The network device is configured to implement operations of the network device in the foregoing embodiments. As shown in FIG. 14, the network device includes an antenna 1101, a radio frequency apparatus 1102, and a baseband apparatus 1103. The antenna 1101 is connected to the radio frequency apparatus 1102. In an uplink direction, the radio frequency apparatus 1102 receives, by using the antenna 1101, information sent by a terminal device; and sends, to the baseband apparatus 1103 for processing, the information sent by the terminal device. In a downlink direction, the baseband apparatus 1103 processes the information of the terminal, and sends the processed information to the radio frequency apparatus 1102; and the radio frequency apparatus 1102 processes the information of the terminal device, and then sends the processed information to the terminal by using the antenna 1101.

The baseband apparatus 1103 may include one or more processing elements 11031, for example, a controlling CPU and another integrated circuit. In addition, the baseband apparatus 1103 may further include a storage element 11032 and an interface 11033. The storage element 11032 is configured to store a program and data. The interface 11033 is configured to exchange information with the radio frequency apparatus 1102. The interface is, for example, a common public radio interface (CPRI). The foregoing apparatus applied to the network device may be located in the baseband apparatus 1103. For example, the foregoing apparatus applied to the network device may be a chip in the baseband apparatus 1103. The chip includes at least one processing element and an interface circuit. The processing element is configured to perform steps in any method performed by the network device. The interface circuit is configured to communicate with another apparatus. In an implementation, the units in the network device for implementing the steps in the foregoing method may be implemented in a form of scheduling a program by the processing element. For example, the apparatus applied to the network device includes a processing element and a storage element. The processing element invokes a program stored in the storage element, to perform the method performed by the network device in the foregoing method embodiment. The storage element may be a storage element on the same chip as the processing element, that is, an on-chip storage element; or may be a storage element that is on a different chip from the processing element, that is, an off-chip storage element.

In another implementation, the units in the network device for implementing steps in the foregoing method may be configured as one or more processing elements. These processing elements are disposed on the baseband apparatus. The processing element herein may be an integrated circuit, for example, one or more ASICs, one or more DSPs, one or more FPGAs, or a combination of these types of integrated circuits. These integrated circuits may be integrated together to form a chip.

The units in the network device for implementing the steps in the foregoing method may be integrated together and implemented in a form of an SOC. For example, the baseband apparatus includes an SOC chip that is configured to implement the foregoing method. The at least one processing element and the storage element may be integrated into the chip, and the processing element invokes the program stored in the storage element to implement the foregoing method performed by the network device. Alternatively, at least one integrated circuit may be integrated into the chip, and configured to implement the foregoing method performed by the network device. Alternatively, with reference to the foregoing implementation, functions of some units are implemented in a form of a program invoked by the processing element, and functions of some units are implemented in a form of an integrated circuit.

It may be learned that the foregoing apparatus applied to the network device may include the at least one processing element and the interface circuit. The at least one processing element is configured to perform the method that is performed by the network device and that is provided in the foregoing method embodiment. The processing element may perform, in a first manner, that is, in a manner of executing a program stored in the storage element, some or all of the steps performed by the network device; or may perform, in a second manner, that is, in a manner of combining an integrated logical circuit of hardware in the processing element with an instruction, some or all of the steps performed by the network device; or may certainly perform, by combining the first manner and the second manner, some or all of the steps performed by the network device.

As described above, the processing element herein may be a general purpose processor, for example, a CPU, or may be one or more integrated circuits configured to implement the foregoing method, for example, one or more ASICs, one or more microprocessors DSPs, one or more FPGAs, or a combination of at least two of these forms of integrated circuits.

The storage element may be a memory, or may be a general term of a plurality of storage elements.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (that may be a personal computer, a server, or a network device) to perform all or some of the steps of the methods described in the embodiments of this application. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments and implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel quality measurement method, comprising:
    receiving, by a terminal device, configuration information from a network device, wherein the configuration information configures a downlink carrier set;
    determining, by the terminal device, a first downlink carrier from the downlink carrier set;
    sending, by the terminal device, a random access process message 1 (Msg1) to the network device;
    receiving, by the terminal device, a random access process message 2 (Msg2) sent by the network device using a second downlink carrier, and the first downlink carrier and the second downlink carrier are different downlink carriers; and
    sending, by the terminal device, a random access process message 3 (Msg3) to the network device, wherein the Msg3 comprises first information and second information, the first information indicates channel quality of the first downlink carrier, the second information indicates channel quality of a second downlink carrier, wherein the channel quality provides information about a first repetition level to the network device, and the first repetition level is a minimum repetition level required when transmission performed on a downlink channel based on a preset transmission parameter meets a preset block error rate.

2. The method according to claim 1, wherein the determining, by the terminal device, the first downlink carrier from the downlink carrier set, comprises:
    determining, by the terminal device, one or more downlink carriers from the downlink carrier set;
    measuring, by the terminal device, channel quality of each of the one or more downlink carriers; and
    determining, by the terminal device, the first downlink carrier based on the channel quality of each downlink carrier, wherein the first downlink carrier is one or more downlink carriers with a best channel quality in the one or more downlink carriers.

3. The method according to claim 1, wherein the determining, by the terminal device, the first downlink carrier from the downlink carrier set, comprises:
    determining, by the terminal device, the first downlink carrier from the downlink carrier set according to a preset rule.

4. The method according to claim 3, wherein the determining, by the terminal device, the first downlink carrier from the downlink carrier set according to the preset rule, comprises:
    determining, by the terminal device, a paging carrier in the downlink carrier set as the first downlink carrier; or
    determining, by the terminal device, the first downlink carrier from the downlink carrier set based on identification information of the terminal device.

5. The method according to claim 1, wherein:
    the first information includes the information used to indicate the channel quality of the first downlink carrier, and the second information includes information used to indicate a deviation of the channel quality of the downlink carrier on which the Msg2 is located, relative to the channel quality of the first downlink carrier; or
    the second information includes the information used to indicate the channel quality of the downlink carrier on which the Msg2 is located, and the first information includes information used to indicate a deviation of the channel quality of the first downlink carrier relative to the channel quality of the downlink carrier on which the Msg2 is located.

6. A channel quality measurement method, comprising:
    determining, by a network device, configuration information that configures a downlink carrier set comprising a first downlink carrier;
    sending, by the network device, the configuration information to a terminal device;
    receiving, by the network device, a random access process message 1 (Msg1) sent by the terminal device;
    sending, by the network device, a random access process message 2 (Msg2) sent to the terminal device using a second downlink carrier, and the first downlink carrier and the second downlink carrier are different downlink carriers; and receiving, by the network device, a random access process message 3 (Msg3) sent by the terminal device, wherein the Msg3 comprises first information and second information, the first information indicates channel quality of the first downlink carrier, the second information indicates channel quality of a second downlink carrier, wherein the channel quality provides information about a first repetition level to the network device, and the first repetition level is a minimum repetition level required when transmission performed on a downlink channel based on a preset transmission parameter meets a preset block error rate.

7. The method according to claim 6, wherein the first downlink carrier is one or more downlink carriers with a best channel quality for the terminal device in one or more downlink carriers in the downlink carrier set.

8. The method according to claim 6, wherein the first information further comprises information indicating a location of the first downlink carrier.

9. The method according to claim 6, wherein the method further comprises:
determining, by the network device, load of the first downlink carrier based on the channel quality of the first downlink carrier; and
adjusting, by the network device, the load of the first downlink carrier.

10. The method according to claim 6, wherein:
the first information includes the information used to indicate the channel quality of the first downlink carrier, and the second information includes information used to indicate a deviation of the channel quality of the downlink carrier on which the Msg2 is located, relative to the channel quality of the first downlink carrier; or
the second information includes the information used to indicate the channel quality of the downlink carrier on which the Msg2 is located, and the first information includes information used to indicate a deviation of the channel quality of the first downlink carrier relative to the channel quality of the downlink carrier on which the Msg2 is located.

11. A channel quality measurement apparatus, comprising:
a transceiver, configured to receive configuration information sent by a network device, wherein the configuration information configures a downlink carrier set; and
a processor, configured to determine a first downlink carrier from the downlink carrier set, wherein
the transceiver is further configured to:
send a random access process message 1 (Msg1) to the network device,
receive a random access process message 2 (Msg2) sent by the network device using a second downlink carrier, and the first downlink carrier and the second downlink carrier are different downlink carriers, and
send a random access process message 3 (Msg3) to the network device, wherein the Msg3 comprises first information and second information, the first information indicates channel quality of the first downlink carrier, the second information indicates channel quality of a second downlink carrier, wherein the channel quality provides information about a first repetition level to the network device, and the first repetition level is a minimum repetition level required when transmission performed on a downlink channel based on a preset transmission parameter meets a preset block error rate.

12. The apparatus according to claim 11, wherein the processor is configured to determine the first downlink carrier further comprises the processor configured to:
determine one or more downlink carriers from the downlink carrier set;
measure channel quality of each of the one or more downlink carriers; and
determine the first downlink carrier based on the channel quality of each downlink carrier, wherein the first downlink carrier is one or more downlink carriers with best channel quality in the one or more downlink carriers.

13. The apparatus according to claim 11, wherein the processor is configured to determine the first downlink carrier further comprises the processor configured to:
determine the first downlink carrier from the downlink carrier set according to a preset rule.

14. The apparatus according to claim 13, wherein the processor is configured to determine the first downlink carrier according to the preset rule further comprises the processor configured to:
determine a paging carrier in the downlink carrier set as the first downlink carrier; or
determine the first downlink carrier from the downlink carrier set based on identification information of the apparatus.

15. The apparatus according to claim 11, wherein:
the first information includes the information used to indicate the channel quality of the first downlink carrier, and the second information includes information used to indicate a deviation of the channel quality of the downlink carrier on which the Msg2 is located, relative to the channel quality of the first downlink carrier; or
the second information includes the information used to indicate the channel quality of the downlink carrier on which the Msg2 is located, and the first information includes information used to indicate a deviation of the channel quality of the first downlink carrier relative to the channel quality of the downlink carrier on which the Msg2 is located.

16. A channel quality measurement apparatus, comprising:
a processor, configured to determine configuration information that configures a downlink carrier set comprising a first downlink carrier; and
a transceiver, configured to:
send the configuration information to a terminal device,
receive a random access process message 1 (Msg1) sent by the terminal device,
send a random access process message 2 (Msg2) sent to the terminal device using a second downlink carrier, and the first downlink carrier and the second downlink carrier are different downlink carriers, and
receive a random access process message 3 (Msg3) sent by the terminal device, wherein the Msg3 comprises first information and second information, the first information indicates channel quality of the first downlink carrier, the second information indicates channel quality of a second downlink carrier, wherein the channel quality provides information about a first repetition level to the apparatus, and the first repetition level is a minimum repetition level required when transmission performed on a downlink channel based on a preset transmission parameter meets a preset block error rate.

17. The apparatus according to claim 16, wherein the first downlink carrier is one or more downlink carriers with a best channel quality for the terminal device in one or more downlink carriers in the downlink carrier set.

18. The apparatus according to claim 16, wherein the first information further comprises information indicating a location of the first downlink carrier.

19. The apparatus according to claim 16, wherein the processor is further configured to:
  determine load of the first downlink carrier based on the channel quality of the first downlink carrier; and
  adjust the load of the first downlink carrier.

20. The apparatus according to claim 16, wherein:
  the first information includes the information used to indicate the channel quality of the first downlink carrier, and the second information includes information used to indicate a deviation of the channel quality of the downlink carrier on which the Msg2 is located, relative to the channel quality of the first downlink carrier; or
  the second information includes the information used to indicate the channel quality of the downlink carrier on which the Msg2 is located, and the first information includes information used to indicate a deviation of the channel quality of the first downlink carrier relative to the channel quality of the downlink carrier on which the Msg2 is located.

* * * * *